US010032255B2

(12) United States Patent
Askan

(10) Patent No.: US 10,032,255 B2
(45) Date of Patent: *Jul. 24, 2018

(54) SYSTEM FOR SMOOTHING 3D CLOUDS

(71) Applicant: Yoldas Askan, Bedford (GB)

(72) Inventor: Yoldas Askan, Bedford (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/043,492

(22) Filed: Feb. 12, 2016

(65) Prior Publication Data
US 2016/0292829 A1 Oct. 6, 2016

Related U.S. Application Data

(63) Continuation of application No. 14/166,840, filed on Jan. 28, 2014, now Pat. No. 9,300,841, which is a continuation-in-part of application No. 13/532,691, filed on Jun. 25, 2012, now Pat. No. 8,705,110.

(51) Int. Cl.
G06K 9/42 (2006.01)
G06K 15/00 (2006.01)
G06T 5/00 (2006.01)
H04N 1/38 (2006.01)
G06T 17/00 (2006.01)
G06T 1/60 (2006.01)
G06T 5/20 (2006.01)
G06T 7/73 (2017.01)

(52) U.S. Cl.
CPC ............... G06T 5/002 (2013.01); G06T 1/60 (2013.01); G06T 5/20 (2013.01); G06T 7/73 (2017.01); G06T 17/00 (2013.01); H04N 1/38 (2013.01); G06T 2200/08 (2013.01); G06T 2207/10028 (2013.01)

(58) Field of Classification Search
CPC ....... G06T 17/00; G06T 2200/08; G06T 1/60; G06T 2207/10028; G06T 5/002; E05F 15/0026; E05F 2015/0043; E05F 2015/0086; E05Y 2900/531
USPC .............. 382/256; 358/1.9, 1.13, 1.18, 1.14; 345/422, 642, 427, 419, 420, 423
See application file for complete search history.

(56) References Cited

U.S. PATENT DOCUMENTS 7,023,432 B2* 4/2006 Fletcher .................. G06T 17/20
345/419
8,456,471 B2* 6/2013 Wallace .................. G06T 15/30
345/427
9,256,980 B2* 2/2016 Kirk ......................... G06T 15/04
9,767,598 B2* 9/2017 Winder .................... G06T 15/04

* cited by examiner

Primary Examiner — Charlotte M Baker

(57) ABSTRACT

A method and apparatus for processing an array of pixels in a point cloud, comprises calculating local error limits for each distance value for each pixel in the processed point cloud data set. One may then determine the error bar. One begins a distance value adjusting loop by for each pixel in the processed point cloud data set by calculating the difference between the distance value in the pixel of the point cloud data set being processed and each of the neighboring pixels or the most suitable neighboring pixel distance value is determined whether or not the difference is within the range defined by the error bar. The number of neighboring pixels with their distance values within the error bar for the pixel being processed is counted.

10 Claims, 77 Drawing Sheets

```
void CPointCloudApp::DeleteErr()    //    Delete scatter points - Option 2
{
    CMainFrame *pFrame = (CMainFrame*)AfxGetMainWnd();

int SurPix = 0;
    float Rr;
    float sur[8];
    float diff[8];
    for( int c = 1; c < pFrame->g_numCols - 1; c++ ){
        for( int r = 1; r < pFrame->g_numRows - 1; r++ ){

Rr = pFrame->Cloud[r][c].r;

float osc;
            if( Rr <= 1.f ){
                osc =  1.7f / 1000.f;
            }
            if( Rr > 1.f ){
                osc =  1.7f / 1000.f + ( Rr / 5000.f );
            }

//    Already averaged points
            sur[0] = pFrame->Cloud[r - 1][c].r;
            diff[0] = fabs( Rr - sur[0] );
            if( diff[0] < osc ){
                SurPix = SurPix + 1;
            }
            sur[1] = pFrame->Cloud[r - 1][c + 1].r;
            diff[1] = fabs( Rr - sur[1] );
            if( diff[1] < osc ){
                SurPix = SurPix + 1;
            }
```

FIG. 23a

```
sur[2] = pFrame->Cloud[r][c - 1].r;
diff[2] = fabs( Rr - sur[2] );
if( diff[2] < osc ){
    SurPix = SurPix + 1;
}
sur[3] = pFrame->Cloud[r - 1][c - 1].r;
diff[3] = fabs( Rr - sur[3] );
if( diff[3] < osc ){
    SurPix = SurPix + 1;
}
//    Not averaged points
sur[4] = pFrame->Cloud[r][c + 1].r;
diff[4] = fabs( Rr - sur[4] );
if( diff[4] < osc ){
    SurPix = SurPix + 1;
}
sur[5] = pFrame->Cloud[r + 1][c + 1].r;
diff[5] = fabs( Rr - sur[5] );
if( diff[5] < osc ){
    SurPix = SurPix + 1;
}
sur[6] = pFrame->Cloud[r + 1][c].r;
diff[6] = fabs( Rr - sur[6] );
if( diff[6] < osc ){
    SurPix = SurPix + 1;
}
sur[7] = pFrame->Cloud[r + 1][c - 1].r;
diff[7] = fabs( Rr - sur[7] );
if( diff[7] < osc ){
    SurPix = SurPix + 1;
}
```

FIG. 23b

```
//      Surface continuity function
if( Rr < 1.f ){
    if( SurPix < 4 ){
        pFrame->Cloud[r][c].r = 0.0f ;
    }
}
if( Rr >= 1.f && Rr < 2.f){
    if( SurPix < 2 ){
        pFrame->Cloud[r][c].r = 0.0f ;
    }
}
if( Rr >= 2.f){
    if( SurPix < 1 ){
        pFrame->Cloud[r][c].r = 0.0f ;
    }
}

SurPix = 0;
        }
    }
}
```

FIG. 23c

```
void CPointCloudApp::CompressMaxMin()
{
    CMainFrame *pFrame = (CMainFrame*)AfxGetMainWnd();

int MaxPos = 10;
    int MinPos = 10;
    float MaxVal = 0.f;
    float MinVal = 0.f;
    float MeanVal;
    float Rr;
    float sur[8];

for( int c = 1; c < pFrame->g_numCols - 1; c += 2 ){
        for( int r = 1; r < pFrame->g_numRows - 1; r += 2 ){

Rr = pFrame->Cloud[r][c].r;
            if( Rr > 0.1f ){ float osc;
                if( Rr <= 1.f ){
                    osc =  1.7f / 1000.f;
                }
                if( Rr > 1.f ){
                    osc =  1.7f / 1000.f + ( Rr / 5000.f );
                }
```

FIG. 24a

```
//      Pixel neighbour
                    sur[0] = pFrame->Cloud[r - 1][c - 1].r;
                    sur[1] = pFrame->Cloud[r - 1][c].r;
                    sur[2] = pFrame->Cloud[r - 1][c + 1].r;
                    sur[3] = pFrame->Cloud[r][c - 1].r;
                    sur[4] = pFrame->Cloud[r][c + 1].r;
                    sur[5] = pFrame->Cloud[r + 1][c - 1].r;
                    sur[6] = pFrame->Cloud[r + 1][c].r;
                    sur[7] = pFrame->Cloud[r + 1][c + 1].r;

MaxVal = sur[0];
                    MinVal = sur[0];
                    MaxPos = 0;
                    MinPos = 0;
                    MeanVal = 0;

for( int l = 0; l < 8; l++ ){
                        if( fabs( Rr - sur[l] ) < osc ){
                            if( sur[l] > MaxVal ){
                                MaxVal = sur[l];
                                MaxPos = l;
                            }
                            if( sur[l] < MinVal ){
                                MinVal = sur[l];
                                MinPos = l;
                            }
                        }
                    } if( ( fabs(MaxVal) - fabs(MinVal) ) < osc ){
                        MeanVal = ( MaxVal + MinVal ) / 2.f;
```

FIG. 24b

```
            if( MaxPos == 0 || MinPos == 0 ){
                pFrame->Cloud[r - 1][c - 1].r = MeanVal;
            }
            if( MaxPos == 1 || MinPos == 1 ){
                pFrame->Cloud[r - 1][c].r = MeanVal;
            }
            if( MaxPos == 2 || MinPos == 2 ){
                pFrame->Cloud[r - 1][c + 1].r = MeanVal;
            }
            if( MaxPos == 3 || MinPos == 3 ){
                pFrame->Cloud[r][c - 1].r = MeanVal;
            }
            if( MaxPos == 4 || MinPos == 4 ){
                pFrame->Cloud[r][c + 1].r = MeanVal;
            }
            if( MaxPos == 5 || MinPos == 5 ){
                pFrame->Cloud[r + 1][c - 1].r = MeanVal;
            }
            if( MaxPos == 6 || MinPos == 6 ){
                pFrame->Cloud[r + 1][c].r = MeanVal;
            }
            if( MaxPos == 7 || MinPos == 7 ){
                pFrame->Cloud[r + 1][c + 1].r = MeanVal;
            }
        }
    }
  }
}
```

FIG. 24c

```
MaxVal = 0;
MinVal = 0;
MaxPos = 0;
MinPos = 0;
MeanVal = 0;

for( int c = 2; c < pFrame->g_numCols - 1; c += 2 ){
      for( int r = 2; r < pFrame->g_numRows - 1; r += 2 ){

Rr = pFrame->Cloud[r][c].r;
            if( Rr > 0.1f ){ float osc;
                  if( Rr <= 1.f ){
                        osc =  1.7f / 1000.f;
                  }
                  if( Rr > 1.f ){
                        osc =  1.7f / 1000.f + ( Rr / 5000.f );
                  }

//    Pixel neighbour
                  sur[0] = pFrame->Cloud[r - 1][c - 1].r;
                  sur[1] = pFrame->Cloud[r - 1][c].r;
                  sur[2] = pFrame->Cloud[r - 1][c + 1].r;
                  sur[3] = pFrame->Cloud[r][c - 1].r;
                  sur[4] = pFrame->Cloud[r][c + 1].r;
                  sur[5] = pFrame->Cloud[r + 1][c - 1].r;
                  sur[6] = pFrame->Cloud[r + 1][c].r;
                  sur[7] = pFrame->Cloud[r + 1][c + 1].r;

MaxVal = sur[0];
                  MinVal = sur[0];
                  MaxPos = 0;
                  MinPos = 0;
                  MeanVal = 0;
```

FIG. 24d

```
for( int l = 0; l < 8; l++ ){
    if( fabs( Rr - sur[l] ) < osc ){
        if( sur[l] > MaxVal ){
            MaxVal = sur[l];
            MaxPos = l;
        }
        if( sur[l] < MinVal ){
            MinVal = sur[l];
            MinPos = l;
        }
    }
} if( ( fabs(MaxVal) - fabs(MinVal) ) < osc ){
    MeanVal = ( MaxVal + MinVal ) / 2.f;

if( MaxPos == 0 || MinPos == 0 ){
        pFrame->Cloud[r - 1][c - 1].r = MeanVal;
    }
    if( MaxPos == 1 || MinPos == 1 ){
        pFrame->Cloud[r - 1][c].r = MeanVal;
    }
    if( MaxPos == 2 || MinPos == 2 ){
        pFrame->Cloud[r - 1][c + 1].r = MeanVal;
    }
    if( MaxPos == 3 || MinPos == 3 ){
        pFrame->Cloud[r][c - 1].r = MeanVal;
    }
    if( MaxPos == 4 || MinPos == 4 ){
        pFrame->Cloud[r][c + 1].r = MeanVal;
    }
    if( MaxPos == 5 || MinPos == 5 ){
        pFrame->Cloud[r + 1][c - 1].r = MeanVal;
    }
```

FIG. 24e

```
                    if( MaxPos == 6 || MinPos == 6 ){
                        pFrame->Cloud[r + 1][c].r = MeanVal;
                    }
                    if( MaxPos == 7 || MinPos == 7 ){
                        pFrame->Cloud[r + 1][c + 1].r = MeanVal;
                    }
                }
            }
        }
    }

```
void CPointCloudApp::PixelNeighborAveraging()
{
    CMainFrame *pFrame = (CMainFrame*)AfxGetMainWnd();

int SurPix = 0;
    float RrSum = 0.0f;
    float Rr;
    float err;
    float RrNew, RrSur, RrOld;

float sur[8];
    float diff[8];

//    Loop count determined by scan resolution
    int J = 1;
    if( pFrame->Resolution == 1.f ){
        J = 4;
    }
    if( pFrame->Resolution == 2.f ){
        J = 2;
    }
    if( pFrame->Resolution == 4.f ){
        J = 1;
    } int LOOP = 8;

for( int j = 0; j < J; j++ ){ for( int loop = 0; loop < LOOP; loop++ ){ for( int row = 1; row < pFrame->g_numRows - 1; row++ ){
                for( int col = 1; col < pFrame->g_numCols - 1; col++
){
```

FIG. 25a

```
Rr = pFrame->Cloud[row][col].r;

//    Error function
if( Rr <= 1.f ){
     err =  1.7f / 1000.f;
}
else if( Rr > 1.f ){
     err =  1.7f / 1000.f + ( Rr / 5000.f );
} if( loop == 0 ){
     RrSur = pFrame->Cloud[row - 1][col].r;
     RrNew = ( (Rr * ( 1 + loop )) + RrSur ) / ( 2 + loop );

if( fabs( RrNew - Rr ) > err ){
          pFrame->Cloud[row][col].r = Rr + (Rr / 10000.f);

}
     else{
          pFrame->Cloud[row][col].r = RrNew;
     }
} if( loop == 1 ){
     RrSur = pFrame->Cloud[row - 1][col + 1].r;

RrNew = ( (Rr * ( 1 + loop )) + RrSur ) / ( 2 + loop );

if( fabs( RrNew - Rr ) > err ){
          pFrame->Cloud[row][col].r = Rr - (Rr / 10000.f);

```
                                else{
                                        pFrame->Cloud[row][col].r = RrNew;
                                }
                        } if( loop == 2 ){
                                RrSur = pFrame->Cloud[row][col - 1].r;
                                RrNew = ( (Rr * ( 1 + loop )) + RrSur ) /
( 2 + loop );

if( fabs( RrNew - Rr ) > err ){
                                        pFrame->Cloud[row][col].r = Rr +
(Rr / 10000.f);
                                }
                                else{
                                        pFrame->Cloud[row][col].r = RrNew;
                                }
                        } if( loop == 3 ){
                                RrSur = pFrame->Cloud[row - 1][col -
1].r;
                                RrNew = ( (Rr * ( 1 + loop )) + RrSur ) /
( 2 + loop );

if( fabs( RrNew - Rr ) > err ){
                                        pFrame->Cloud[row][col].r = Rr -
(Rr / 10000.f);
                                }
                                else{
                                        pFrame->Cloud[row][col].r = RrNew;
                                }
                        } if( loop == 4 ){
                                RrSur = pFrame->Cloud[row][col + 1].r;
                                RrNew = ( (Rr * ( 1 + loop )) + RrSur ) /
( 2 + loop );
```

FIG. 25c

```
                    if( fabs( RrNew - Rr ) > err ){
                        pFrame->Cloud[row][col].r = Rr +
(Rr / 10000.f);
                    }
                    else{
                        pFrame->Cloud[row][col].r = RrNew;
                    }
                } if( loop == 5 ){
                    RrSur = pFrame->Cloud[row + 1][col +
1].r;
                    RrNew = ( (Rr * ( 1 + loop )) + RrSur ) /
( 2 + loop );
                    if( fabs( RrNew - Rr ) > err ){
                        pFrame->Cloud[row][col].r = Rr -
(Rr / 10000.f);
                    }
                    else{
                        pFrame->Cloud[row][col].r = RrNew;
                    }
                } if( loop == 6 ){
                    RrSur = pFrame->Cloud[row + 1][col].r;
                    RrNew = ( (Rr * ( 1 + loop )) + RrSur ) /
( 2 + loop );
                    if( fabs( RrNew - Rr ) > err ){
                        pFrame->Cloud[row][col].r = Rr +
(Rr / 10000.f);
                    }
                    else{
                        pFrame->Cloud[row][col].r = RrNew;
                    }
                }
```

FIG. 25d

```
                                if( loop == 7 ){
                                        RrSur = pFrame->Cloud[row + 1][col -
1].r;
                                        RrNew = ( (Rr * ( 1 + loop )) + RrSur ) /
( 2 + loop );
                                        if( fabs( RrNew - Rr ) > err ){
                                                pFrame->Cloud[row][col].r = Rr -
(Rr / 10000.f);
                                        }
                                        else{
                                                pFrame->Cloud[row][col].r = RrNew;
                                        }
                                }

}
                }

//      Pixel neighbour error
                if( loop == 0 ){
                        for( int c = 1; c < pFrame->g_numCols - 1; c++ ){
                                for( int r = 1; r < pFrame->g_numRows - 1; r++
){
                                        RrOld = pFrame->Cloud[r][c].r;
                                        if( RrOld > 0.1 ){
                                                //      Pixel neighbour
                                                sur[0] = pFrame->Cloud[r - 1][c -
1].r;
                                                sur[1] = pFrame->Cloud[r - 1][c].r;
                                                sur[2] = pFrame->Cloud[r - 1][c +
1].r;
                                                sur[3] = pFrame->Cloud[r][c - 1].r;
                                                sur[4] = pFrame->Cloud[r][c + 1].r;
                                                sur[5] = pFrame->Cloud[r + 1][c -
1].r;
```

FIG. 25e

```
sur[6] = pFrame->Cloud[r + 1][c].r;
sur[7] = pFrame->Cloud[r + 1][c +
1].r;

diff[0] = RrOld - sur[0];
diff[1] = RrOld - sur[1];
diff[2] = RrOld - sur[2];
diff[3] = RrOld - sur[3];
diff[4] = RrOld - sur[4];
diff[5] = RrOld - sur[5];
diff[6] = RrOld - sur[6];
diff[7] = RrOld - sur[7];

float osc;
if( RrOld <= 1.f ){
    osc =  1.7f / 1000.f;
}
if( RrOld > 1.f ){
    osc =  1.7f / 1000.f + ( Rr /
5000.f );
}

//   Already averaged points
if( fabs(diff[0]) < osc ){
    SurPix = SurPix + 1;
    RrSum = RrSum + (RrOld -
(diff[0] / ( pFrame->Resolution * RrOld )));
}
if( fabs(diff[1]) < osc ){
    SurPix = SurPix + 1;
    RrSum = RrSum + (RrOld -
(diff[1] / ( pFrame->Resolution * RrOld )));
}
```

FIG. 25f

```
                                        if( fabs(diff[2]) < osc ){
                                              SurPix = SurPix + 1;
                                              RrSum = RrSum + (RrOld -
(diff[2] / ( pFrame->Resolution * RrOld )));
                                        }
                                        if( fabs(diff[3]) < osc ){
                                              SurPix = SurPix + 1;
                                              RrSum = RrSum + (RrOld -
(diff[3] / ( pFrame->Resolution * RrOld )));
                                        }
                                        //    Not averaged points
                                        if( fabs(diff[4]) < osc ){
                                              SurPix = SurPix + 1;
                                              RrSum = RrSum + (RrOld -
(diff[4] / ( pFrame->Resolution * RrOld )));
                                        }
                                        if( fabs(diff[5]) < osc ){
                                              SurPix = SurPix + 1;
                                              RrSum = RrSum + (RrOld -
(diff[5] / ( pFrame->Resolution * RrOld )));
                                        }
                                        if( fabs(diff[6]) < osc ){
                                              SurPix = SurPix + 1;
                                              RrSum = RrSum + (RrOld -
(diff[6] / ( pFrame->Resolution * RrOld )));
                                        }
                                        if( fabs(diff[7]) < osc ){
                                              SurPix = SurPix + 1;
                                              RrSum = RrSum + (RrOld -
(diff[7] / ( pFrame->Resolution * RrOld )));
                                        }
```

FIG. 25g

```
                                        //      Constant Pixel Neighbor Count
Function threshold count
                                        if( SurPix > 5 ){
                                                pFrame->Cloud[r][c].r =
(float)(RrSum / SurPix);
                                        }

SurPix = 0;
                                        RrSum = 0.0f;
                                }
                        }
                }
        } if( loop == 1 ){
                for( int c = pFrame->g_numCols - 2; c > 1; c-- ){
                        for( int r = 1; r < pFrame->g_numRows - 1; r++
){
                                RrOld = pFrame->Cloud[r][c].r;
                                if( RrOld > 0.1 ){
                                        //      Pixel neighbour
                                        sur[0] = pFrame->Cloud[r - 1][c -
1].r;
                                        sur[1] = pFrame->Cloud[r - 1][c].r;
                                        sur[2] = pFrame->Cloud[r - 1][c +
1].r;
                                        sur[3] = pFrame->Cloud[r][c - 1].r;
                                        sur[4] = pFrame->Cloud[r][c + 1].r;
                                        sur[5] = pFrame->Cloud[r + 1][c -
1].r;
                                        sur[6] = pFrame->Cloud[r + 1][c].r;
                                        sur[7] = pFrame->Cloud[r + 1][c +
1].r;
```

FIG. 25h

```
diff[0] = RrOld - sur[0];
diff[1] = RrOld - sur[1];
diff[2] = RrOld - sur[2];
diff[3] = RrOld - sur[3];
diff[4] = RrOld - sur[4];
diff[5] = RrOld - sur[5];
diff[6] = RrOld - sur[6];
diff[7] = RrOld - sur[7];

float osc;
if( RrOld <= 1.f ){
    osc =  1.7f / 1000.f;
}
if( RrOld > 1.f ){
    osc =  1.7f / 1000.f + ( Rr / 5000.f );
}

//    Already averaged points
if( fabs(diff[0]) < osc ){
    SurPix = SurPix + 1;
    RrSum = RrSum + (RrOld - (diff[0] / ( pFrame->Resolution * RrOld )));
}
if( fabs(diff[1]) < osc ){
    SurPix = SurPix + 1;
    RrSum = RrSum + (RrOld - (diff[1] / ( pFrame->Resolution * RrOld )));
}
if( fabs(diff[2]) < osc ){
    SurPix = SurPix + 1;
    RrSum = RrSum + (RrOld - (diff[2] / ( pFrame->Resolution * RrOld )));
}
```

FIG. 25i

```
                                        if( fabs(diff[3]) < osc ){
                                                SurPix = SurPix + 1;
                                                RrSum = RrSum + (RrOld -
(diff[3] / ( pFrame->Resolution * RrOld )));
                                        }
                                        //    Not averaged points
                                        if( fabs(diff[4]) < osc ){
                                                SurPix = SurPix + 1;
                                                RrSum = RrSum + (RrOld -
(diff[4] / ( pFrame->Resolution * RrOld )));
                                        }
                                        if( fabs(diff[5]) < osc ){
                                                SurPix = SurPix + 1;
                                                RrSum = RrSum + (RrOld -
(diff[5] / ( pFrame->Resolution * RrOld )));
                                        }
                                        if( fabs(diff[6]) < osc ){
                                                SurPix = SurPix + 1;
                                                RrSum = RrSum + (RrOld -
(diff[6] / ( pFrame->Resolution * RrOld )));
                                        }
                                        if( fabs(diff[7]) < osc ){
                                                SurPix = SurPix + 1;
                                                RrSum = RrSum + (RrOld -
(diff[7] / ( pFrame->Resolution * RrOld )));
                                        }
                                        if( SurPix > 5 ){
                                                pFrame->Cloud[r][c].r =
(float)(RrSum / SurPix);
                                        }

SurPix = 0;
                                        RrSum = 0.0f;
                                }
                            }
                       }
                }
```

FIG. 25j

```
            if( loop == 2 ){
                for( int c = pFrame->g_numCols - 2; c > 1; c-- ){
                    for( int r = pFrame->g_numRows - 2; r > 1; r--
){
                        RrOld = pFrame->Cloud[r][c].r;
                        if( RrOld > 0.1 ){
                            //    Pixel neighbour
                            sur[0] = pFrame->Cloud[r - 1][c -
1].r;
                            sur[1] = pFrame->Cloud[r - 1][c].r;
                            sur[2] = pFrame->Cloud[r - 1][c +
1].r;

sur[3] = pFrame->Cloud[r][c - 1].r;
                            sur[4] = pFrame->Cloud[r][c + 1].r;
                            sur[5] = pFrame->Cloud[r + 1][c -
1].r;

sur[6] = pFrame->Cloud[r + 1][c].r;
                            sur[7] = pFrame->Cloud[r + 1][c +
1].r;

diff[0] = RrOld - sur[0];
                            diff[1] = RrOld - sur[1];
                            diff[2] = RrOld - sur[2];
                            diff[3] = RrOld - sur[3];
                            diff[4] = RrOld - sur[4];
                            diff[5] = RrOld - sur[5];
                            diff[6] = RrOld - sur[6];
                            diff[7] = RrOld - sur[7];

float osc;
                            if( RrOld <= 1.f ){
                                osc =  1.7f / 1000.f;
                            }
```

FIG. 25k

```
                                        if( RrOld > 1.f ){
                                            osc =  1.7f / 1000.f + ( Rr /
5000.f );
                                        }

//    Already averaged points
                                        if( fabs(diff[0]) < osc ){
                                            SurPix = SurPix + 1;
                                            RrSum = RrSum + (RrOld -
(diff[0] / ( pFrame->Resolution * RrOld )));
                                        }
                                        if( fabs(diff[1]) < osc ){
                                            SurPix = SurPix + 1;
                                            RrSum = RrSum + (RrOld -
(diff[1] / ( pFrame->Resolution * RrOld )));
                                        }
                                        if( fabs(diff[2]) < osc ){
                                            SurPix = SurPix + 1;
                                            RrSum = RrSum + (RrOld -
(diff[2] / ( pFrame->Resolution * RrOld )));
                                        }
                                        if( fabs(diff[3]) < osc ){
                                            SurPix = SurPix + 1;
                                            RrSum = RrSum + (RrOld -
(diff[3] / ( pFrame->Resolution * RrOld )));
                                        }
                                        //    Not averaged points
                                        if( fabs(diff[4]) < osc ){
                                            SurPix = SurPix + 1;
                                            RrSum = RrSum + (RrOld -
(diff[4] / ( pFrame->Resolution * RrOld )));
                                        }
                                        if( fabs(diff[5]) < osc ){
                                            SurPix = SurPix + 1;
                                            RrSum = RrSum + (RrOld -
(diff[5] / ( pFrame->Resolution * RrOld )));
                                        }
```

FIG. 25l

```
                                        if( fabs(diff[6]) < osc ){
                                                SurPix = SurPix + 1;
                                                RrSum = RrSum + (RrOld -
(diff[6] / ( pFrame->Resolution * RrOld )));
                                        }
                                        if( fabs(diff[7]) < osc ){
                                                SurPix = SurPix + 1;
                                                RrSum = RrSum + (RrOld -
(diff[7] / ( pFrame->Resolution * RrOld )));
                                        }
                                        if( SurPix > 5 ){
                                                pFrame->Cloud[r][c].r =
(float)(RrSum / SurPix);
                                        }

SurPix = 0;
                                        RrSum = 0.0f;
                                }
                        }
                    }
                } if( loop == 3 ){
                    for( int c = 1; c < pFrame->g_numCols - 1; c++ ){
                        for( int r = pFrame->g_numRows - 2; r > 1; r--
){
                                RrOld = pFrame->Cloud[r][c].r;
                                if( RrOld > 0.1 ){
                                        //     Pixel neighbour
                                        sur[0] = pFrame->Cloud[r - 1][c -
1].r;
                                        sur[1] = pFrame->Cloud[r - 1][c].r;
                                        sur[2] = pFrame->Cloud[r - 1][c +
1].r;
                                        sur[3] = pFrame->Cloud[r][c - 1].r;
```

FIG. 25m

```
                                sur[4] = pFrame->Cloud[r][c + 1].r;
                                sur[5] = pFrame->Cloud[r + 1][c -
1].r;
                                sur[6] = pFrame->Cloud[r + 1][c].r;
                                sur[7] = pFrame->Cloud[r + 1][c +
1].r;

diff[0] = RrOld - sur[0];
                                diff[1] = RrOld - sur[1];
                                diff[2] = RrOld - sur[2];
                                diff[3] = RrOld - sur[3];
                                diff[4] = RrOld - sur[4];
                                diff[5] = RrOld - sur[5];
                                diff[6] = RrOld - sur[6];
                                diff[7] = RrOld - sur[7];

float osc;
                                if( RrOld <= 1.f ){
                                     osc =  1.7f / 1000.f;
                                }
                                if( RrOld > 1.f ){
                                     osc =  1.7f / 1000.f + ( Rr /
5000.f );
                                }

//    Already averaged points
                                if( fabs(diff[0]) < osc ){
                                     SurPix = SurPix + 1;
                                     RrSum = RrSum + (RrOld -
(diff[0] / ( pFrame->Resolution * RrOld )));
                                }
                                if( fabs(diff[1]) < osc ){
                                     SurPix = SurPix + 1;
                                     RrSum = RrSum + (RrOld -
(diff[1] / ( pFrame->Resolution * RrOld )));
                                }
```

FIG. 25n

```
                                        if( fabs(diff[2]) < osc ){
                                            SurPix = SurPix + 1;
                                            RrSum = RrSum + (RrOld -
(diff[2] / ( pFrame->Resolution * RrOld )));
                                        }
                                        if( fabs(diff[3]) < osc ){
                                            SurPix = SurPix + 1;
                                            RrSum = RrSum + (RrOld -
(diff[3] / ( pFrame->Resolution * RrOld )));
                                        }
                                        //   Not averaged points
                                        if( fabs(diff[4]) < osc ){
                                            SurPix = SurPix + 1;
                                            RrSum = RrSum + (RrOld -
(diff[4] / ( pFrame->Resolution * RrOld )));
                                        }
                                        if( fabs(diff[5]) < osc ){
                                            SurPix = SurPix + 1;
                                            RrSum = RrSum + (RrOld -
(diff[5] / ( pFrame->Resolution * RrOld )));
                                        }
                                        if( fabs(diff[6]) < osc ){
                                            SurPix = SurPix + 1;
                                            RrSum = RrSum + (RrOld -
(diff[6] / ( pFrame->Resolution * RrOld )));
                                        }
                                        if( fabs(diff[7]) < osc ){
                                            SurPix = SurPix + 1;
                                            RrSum = RrSum + (RrOld -
(diff[7] / ( pFrame->Resolution * RrOld )));
                                        }
                                        if( SurPix > 5 ){
                                            pFrame->Cloud[r][c].r =
(float)(RrSum / SurPix);
                                        }
```

FIG. 25o

```
                                        SurPix = 0;
                                        RrSum = 0.0f;
                                }
                        }
                }
        } if( loop == 4 ){
                        for( int r = 1; r < pFrame->g_numRows - 1; r++ ){
                                for( int c = 1; c < pFrame->g_numCols - 1; c++
){      //      Nesting swapped
                                        RrOld = pFrame->Cloud[r][c].r;
                                        //      Pixel neighbour
                                        if( RrOld > 0.1 ){
                                                sur[0] = pFrame->Cloud[r - 1][c -
1].r;
                                                sur[1] = pFrame->Cloud[r - 1][c].r;
                                                sur[2] = pFrame->Cloud[r - 1][c +
1].r;
                                                sur[3] = pFrame->Cloud[r][c - 1].r;
                                                sur[4] = pFrame->Cloud[r][c + 1].r;
                                                sur[5] = pFrame->Cloud[r + 1][c -
1].r;
                                                sur[6] = pFrame->Cloud[r + 1][c].r;
                                                sur[7] = pFrame->Cloud[r + 1][c +
1].r;

diff[0] = RrOld - sur[0];
                                                diff[1] = RrOld - sur[1];
                                                diff[2] = RrOld - sur[2];
                                                diff[3] = RrOld - sur[3];
                                                diff[4] = RrOld - sur[4];
                                                diff[5] = RrOld - sur[5];
                                                diff[6] = RrOld - sur[6];
                                                diff[7] = RrOld - sur[7];
```

FIG. 25p

```
                                float osc;
                                if( RrOld <= 1.f ){
                                        osc =  1.7f / 1000.f;
                                }
                                if( RrOld > 1.f ){
                                        osc =  1.7f / 1000.f + ( Rr /
5000.f );
                                }

//    Already averaged points
                                if( fabs(diff[0]) < osc ){
                                        SurPix = SurPix + 1;
                                        RrSum = RrSum + (RrOld -
(diff[0] / ( pFrame->Resolution * RrOld )));
                                }
                                if( fabs(diff[1]) < osc ){
                                        SurPix = SurPix + 1;
                                        RrSum = RrSum + (RrOld -
(diff[1] / ( pFrame->Resolution * RrOld )));
                                }
                                if( fabs(diff[2]) < osc ){
                                        SurPix = SurPix + 1;
                                        RrSum = RrSum + (RrOld -
(diff[2] / ( pFrame->Resolution * RrOld )));
                                }
                                if( fabs(diff[3]) < osc ){
                                        SurPix = SurPix + 1;
                                        RrSum = RrSum + (RrOld -
(diff[3] / ( pFrame->Resolution * RrOld )));
                                }
                                //    Not averaged points
                                if( fabs(diff[4]) < osc ){
                                        SurPix = SurPix + 1;
                                        RrSum = RrSum + (RrOld -
(diff[4] / ( pFrame->Resolution * RrOld )));
                                }
```

FIG. 25q

```
                                if( fabs(diff[5]) < osc ){
                                        SurPix = SurPix + 1;
                                        RrSum = RrSum + (RrOld -
(diff[5] / ( pFrame->Resolution * RrOld )));
                                }
                                if( fabs(diff[6]) < osc ){
                                        SurPix = SurPix + 1;
                                        RrSum = RrSum + (RrOld -
(diff[6] / ( pFrame->Resolution * RrOld )));
                                }
                                if( fabs(diff[7]) < osc ){
                                        SurPix = SurPix + 1;
                                        RrSum = RrSum + (RrOld -
(diff[7] / ( pFrame->Resolution * RrOld )));
                                }
                                if( SurPix > 5 ){
                                        pFrame->Cloud[r][c].r =
(float)(RrSum / SurPix);
                                }

SurPix = 0;
                                RrSum = 0.0f;
                        }
                    }
                }
            } if( loop == 5 ){
                for( int r = 1; r < pFrame->g_numRows - 1; r++ ){
                    for( int c = pFrame->g_numCols - 2; c > 1; c--
){      //      Nesting swapped
                        RrOld = pFrame->Cloud[r][c].r;
                        if( RrOld > 0.1 ){
                            //    Pixel neighbour
                            sur[0] = pFrame->Cloud[r - 1][c -
1].r;
```

FIG. 25r

```
                                        sur[1] = pFrame->Cloud[r - 1][c].r;
                                        sur[2] = pFrame->Cloud[r - 1][c +
1].r;

sur[3] = pFrame->Cloud[r][c - 1].r;
                                        sur[4] = pFrame->Cloud[r][c + 1].r;
                                        sur[5] = pFrame->Cloud[r + 1][c -
1].r;

sur[6] = pFrame->Cloud[r + 1][c].r;
                                        sur[7] = pFrame->Cloud[r + 1][c +
1].r;

diff[0] = RrOld - sur[0];
                                        diff[1] = RrOld - sur[1];
                                        diff[2] = RrOld - sur[2];
                                        diff[3] = RrOld - sur[3];
                                        diff[4] = RrOld - sur[4];
                                        diff[5] = RrOld - sur[5];
                                        diff[6] = RrOld - sur[6];
                                        diff[7] = RrOld - sur[7];

float osc;
                                        if( RrOld <= 1.f ){
                                            osc =  1.7f / 1000.f;
                                        }
                                        if( RrOld > 1.f ){
                                            osc =  1.7f / 1000.f + ( Rr /
5000.f );
                                        }

//   Already averaged points
                                        if( fabs(diff[0]) < osc ){
                                            SurPix = SurPix + 1;
                                            RrSum = RrSum + (RrOld -
(diff[0] / ( pFrame->Resolution * RrOld )));
                                        }
```

FIG. 25s

```
                                        if( fabs(diff[1]) < osc ){
                                                SurPix = SurPix + 1;
                                                RrSum = RrSum + (RrOld -
(diff[1] / ( pFrame->Resolution * RrOld )));
                                        }
                                        if( fabs(diff[2]) < osc ){
                                                SurPix = SurPix + 1;
                                                RrSum = RrSum + (RrOld -
(diff[2] / ( pFrame->Resolution * RrOld )));
                                        }
                                        if( fabs(diff[3]) < osc ){
                                                SurPix = SurPix + 1;
                                                RrSum = RrSum + (RrOld -
(diff[3] / ( pFrame->Resolution * RrOld )));
                                        }
                                        //    Not averaged points
                                        if( fabs(diff[4]) < osc ){
                                                SurPix = SurPix + 1;
                                                RrSum = RrSum + (RrOld -
(diff[4] / ( pFrame->Resolution * RrOld )));
                                        }
                                        if( fabs(diff[5]) < osc ){
                                                SurPix = SurPix + 1;
                                                RrSum = RrSum + (RrOld -
(diff[5] / ( pFrame->Resolution * RrOld )));
                                        }
                                        if( fabs(diff[6]) < osc ){
                                                SurPix = SurPix + 1;
                                                RrSum = RrSum + (RrOld -
(diff[6] / ( pFrame->Resolution * RrOld )));
                                        }
                                        if( fabs(diff[7]) < osc ){
                                                SurPix = SurPix + 1;
                                                RrSum = RrSum + (RrOld -
(diff[7] / ( pFrame->Resolution * RrOld )));
                                        }
```

FIG. 25t

```
                                        if( SurPix > 5 ){
                                                pFrame->Cloud[r][c].r =
(float)(RrSum / SurPix);
                                        }

SurPix = 0;
                                        RrSum = 0.0f;
                                }
                            }
                        }
                    } if( loop == 6 ){
                        for( int r = pFrame->g_numRows - 2; r > 1; r-- ){
                            for( int c = pFrame->g_numCols - 2; c > 1; c--
){       //      Nesting swapped
                                RrOld = pFrame->Cloud[r][c].r;
                                if( RrOld > 0.1 ){
                                        //    Pixel neighbour
                                        sur[0] = pFrame->Cloud[r - 1][c -
1].r;
                                        sur[1] = pFrame->Cloud[r - 1][c].r;
                                        sur[2] = pFrame->Cloud[r - 1][c +
1].r;

sur[3] = pFrame->Cloud[r][c - 1].r;
                                        sur[4] = pFrame->Cloud[r][c + 1].r;
                                        sur[5] = pFrame->Cloud[r + 1][c -
1].r;

sur[6] = pFrame->Cloud[r + 1][c].r;
                                        sur[7] = pFrame->Cloud[r + 1][c +
1].r;

diff[0] = RrOld - sur[0];
                                        diff[1] = RrOld - sur[1];
                                        diff[2] = RrOld - sur[2];
                                        diff[3] = RrOld - sur[3];
```

FIG. 25u

```
                                        diff[4] = RrOld - sur[4];
                                        diff[5] = RrOld - sur[5];
                                        diff[6] = RrOld - sur[6];
                                        diff[7] = RrOld - sur[7];

float osc;
                                        if( RrOld <= 1.f ){
                                              osc =  1.7f / 1000.f;
                                        }
                                        if( RrOld > 1.f ){
                                              osc =  1.7f / 1000.f + ( Rr /
5000.f );
                                        }

//    Already averaged points
                                        if( fabs(diff[0]) < osc ){
                                              SurPix = SurPix + 1;
                                              RrSum = RrSum + (RrOld -
(diff[0] / ( pFrame->Resolution * RrOld )));
                                        }
                                        if( fabs(diff[1]) < osc ){
                                              SurPix = SurPix + 1;
                                              RrSum = RrSum + (RrOld -
(diff[1] / ( pFrame->Resolution * RrOld )));
                                        }
                                        if( fabs(diff[2]) < osc ){
                                              SurPix = SurPix + 1;
                                              RrSum = RrSum + (RrOld -
(diff[2] / ( pFrame->Resolution * RrOld )));
                                        }
                                        if( fabs(diff[3]) < osc ){
                                              SurPix = SurPix + 1;
                                              RrSum = RrSum + (RrOld -
(diff[3] / ( pFrame->Resolution * RrOld )));
                                        }
```

FIG. 25v

```
                                        //    Not averaged points
                                        if( fabs(diff[4]) < osc ){
                                                SurPix = SurPix + 1;
                                                RrSum = RrSum + (RrOld -
(diff[4] / ( pFrame->Resolution * RrOld )));
                                        }
                                        if( fabs(diff[5]) < osc ){
                                                SurPix = SurPix + 1;
                                                RrSum = RrSum + (RrOld -
(diff[5] / ( pFrame->Resolution * RrOld )));
                                        }
                                        if( fabs(diff[6]) < osc ){
                                                SurPix = SurPix + 1;
                                                RrSum = RrSum + (RrOld -
(diff[6] / ( pFrame->Resolution * RrOld )));
                                        }
                                        if( fabs(diff[7]) < osc ){
                                                SurPix = SurPix + 1;
                                                RrSum = RrSum + (RrOld -
(diff[7] / ( pFrame->Resolution * RrOld )));
                                        } if( SurPix > 5 ){
                                                pFrame->Cloud[r][c].r =
(float)(RrSum / SurPix);
                                        }

SurPix = 0;
                                        RrSum = 0.0f;
                                }
                        }
                }
        }
```

FIG. 25w

```
                    if( loop == 7 ){
                        for( int r = pFrame->g_numRows - 2; r > 1; r-- ){
                            for( int c = 1; c < pFrame->g_numCols - 1; c++
){      //      Nesting swapped
                                RrOld = pFrame->Cloud[r][c].r;
                                if( RrOld > 0.1 ){
                                    //    Pixel neighbour
                                    sur[0] = pFrame->Cloud[r - 1][c -
1].r;

sur[1] = pFrame->Cloud[r - 1][c].r;
                                    sur[2] = pFrame->Cloud[r - 1][c +
1].r;

sur[3] = pFrame->Cloud[r][c - 1].r;
                                    sur[4] = pFrame->Cloud[r][c + 1].r;
                                    sur[5] = pFrame->Cloud[r + 1][c -
1].r;

sur[6] = pFrame->Cloud[r + 1][c].r;
                                    sur[7] = pFrame->Cloud[r + 1][c +
1].r;

diff[0] = RrOld - sur[0];
                                    diff[1] = RrOld - sur[1];
                                    diff[2] = RrOld - sur[2];
                                    diff[3] = RrOld - sur[3];
                                    diff[4] = RrOld - sur[4];
                                    diff[5] = RrOld - sur[5];
                                    diff[6] = RrOld - sur[6];
                                    diff[7] = RrOld - sur[7];

float osc;
                                    if( RrOld <= 1.f ){
                                        osc = 1.7f / 1000.f;
                                    }
                                    if( RrOld > 1.f ){
                                        osc = 1.7f / 1000.f + ( Rr /
5000.f );
                                    }
```

FIG. 25x

```
                                    //    Already averaged points
                                    if( fabs(diff[0]) < osc ){
                                         SurPix = SurPix + 1;
                                         RrSum = RrSum + (RrOld -
(diff[0] / ( pFrame->Resolution * RrOld )));
                                    }
                                    if( fabs(diff[1]) < osc ){
                                         SurPix = SurPix + 1;
                                         RrSum = RrSum + (RrOld -
(diff[1] / ( pFrame->Resolution * RrOld )));
                                    }
                                    if( fabs(diff[2]) < osc ){
                                         SurPix = SurPix + 1;
                                         RrSum = RrSum + (RrOld -
(diff[2] / ( pFrame->Resolution * RrOld )));
                                    }
                                    if( fabs(diff[3]) < osc ){
                                         SurPix = SurPix + 1;
                                         RrSum = RrSum + (RrOld -
(diff[3] / ( pFrame->Resolution * RrOld )));
                                    }
                                    //    Not averaged points
                                    if( fabs(diff[4]) < osc ){
                                         SurPix = SurPix + 1;
                                         RrSum = RrSum + (RrOld -
(diff[4] / ( pFrame->Resolution * RrOld )));
                                    }
                                    if( fabs(diff[5]) < osc ){
                                         SurPix = SurPix + 1;
                                         RrSum = RrSum + (RrOld -
(diff[5] / ( pFrame->Resolution * RrOld )));
                                    }
```

FIG. 25y

```
                                        if( fabs(diff[6]) < osc ){
                                            SurPix = SurPix + 1;
                                            RrSum = RrSum + (RrOld -
(diff[6] / ( pFrame->Resolution * RrOld )));
                                        }
                                        if( fabs(diff[7]) < osc ){
                                            SurPix = SurPix + 1;
                                            RrSum = RrSum + (RrOld -
(diff[7] / ( pFrame->Resolution * RrOld )));
                                        }
                                        if( SurPix > 5 ){
                                            pFrame->Cloud[r][c].r =
(float)(RrSum / SurPix);
                                        }

SurPix = 0;
                                        RrSum = 0.0f;
                                    }
                                }
                            }
                        }
                        bar.StepIt();
                        PeekAndPump();
                    }
                    //      End of 8 Iterations
                }

```
void CMainFrame::LocalLimits(int numRows, int numCols,
std::vector<std::vector<Pixel> > &Pix, float &Resolution)
{
    float Max;
    float Min;
    float sur[8];
    float Rr;
    float osc;
    float Third = 1.f / 3.f;

for(int c = 1; c < numCols - 1; c++){
        for(int r = 1; r < numRows - 1; r++){
            Rr = Pix[r][c].r;
            if(Rr > 0.2f && Rr < 119.9f){
                sur[0] = Pix[r - 1][c].r;
                sur[1] = Pix[r - 1][c + 1].r;
                sur[2] = Pix[r][c - 1].r;
                sur[3] = Pix[r - 1][c - 1].r;
                sur[4] = Pix[r][c + 1].r;
                sur[5] = Pix[r + 1][c + 1].r;
                sur[6] = Pix[r + 1][c].r;
                sur[7] = Pix[r + 1][c - 1].r;
                Max = 0;
                Min = 100;
```

FIG. 26a

```
                        for(int s = 0; s < 8; s++){
                            if(sur[s] > 0 && sur[s] > Max)
                                Max = sur[s];
                            if(sur[s] > 0 && sur[s] < Min)
                                Min = sur[s];
                        }
                        //osc = ((pow(Resolution, Third) / 2.f) + Rr) /
1000.f;
                        //osc =  osc * 2.5f;
                        osc = (pow(Resolution, Third) / 4.f) - (Rr /
10000.f);    //    Resolution based error bar limits
                        //osc =  osc * 2.5f;
                        if(Max > Rr + osc){
                            Pix[r][c].rl = Rr + osc;
                        }
                        else{
                            Pix[r][c].rl = Max;
                        }
                        if(Min < Rr - osc){
                            Pix[r][c].rs = Rr - osc;
                        }
                        else{
                            Pix[r][c].rs = Min;
                        }
                    }
                }
            }
        }
```

FIG. 26b

```
void CMainFrame::Converge(int Frame, int numRows, int numCols,
vector<vector<Pixel>>& Pix, float &Resolution, int &Loop)
{
    int SurPix = 0;
    float RrSum = 0.0f;
    float Rr, Rrs, Rrl;
    float RrNew, RrSur, RrOld;
    float osc;
    float Third = 1.f / 3.f;
    float diff[8];
    int impact = 0;
    int loopcursor = 0;

for(int loop = 0; loop < Resolution; loop++){
        loopcursor = loop;
        while(loopcursor >= 8){
            loopcursor = loopcursor - 8;
        } if(loopcursor == 0){
            /*    Point error  */
            for(int row = 1; row < numRows - 1; row++){
                for(int col = 1; col < numCols - 1; col++){
                    Rr = Pix[row][col].r;
                    if(Rr > 0.2f && Rr < 119.9f){
                        RrSur = Pix[row - 1][col].r;    /*
Changes         */
                        impact = (int)(Rr + 100.f / Resolution);
    /*    Resolution weighting */
                        RrNew = ((Rr * (impact + loop)) + RrSur) /
(impact + loop + 1);

if(RrNew > Pix[row][col].rs && RrNew <
Pix[row][col].rl){
                            Pix[row][col].r = RrNew;
                        }
```

FIG. 27a

```
                                if(RrNew <= Pix[row][col].rs){
                                        Pix[row][col].r = (Pix[row][col].rl +
Pix[row][col].rl + Pix[row][col].rs) /  3.f;
                                }
                                if(RrNew >= Pix[row][col].rl){
                                        Pix[row][col].r = (Pix[row][col].rl +
Pix[row][col].rs + Pix[row][col].rs) /  3.f;
                                }
                            }
                        }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                    }

/*    Pixel neighbour error    */
                    for(int c = 1; c < numCols - 1; c++){
                        for(int r = 1; r < numRows - 1; r++){
                            RrOld = Pix[r][c].r;
                            if(RrOld > 0.2f && RrOld < 119.9f){
                                    diff[0] = RrOld - Pix[r - 1][c - 1].r;
                                    diff[1] = RrOld - Pix[r - 1][c].r;
                                    diff[2] = RrOld - Pix[r - 1][c + 1].r;
                                    diff[3] = RrOld - Pix[r][c - 1].r;
                                    diff[4] = RrOld - Pix[r][c + 1].r;
                                    diff[5] = RrOld - Pix[r + 1][c - 1].r;
                                    diff[6] = RrOld - Pix[r + 1][c].r;
                                    diff[7] = RrOld - Pix[r + 1][c + 1].r;

osc = ((pow(Resolution, Third) / 2.f) + (Rr
/ 100.f)) / 1000.f;

for(int s = 0; s < 8; s++){
                                            if(fabs(diff[s]) <= osc){
                                                    SurPix = SurPix + 1;
                                                    RrSum = RrSum + (RrOld -
(diff[s] / (loop + 1 * RrOld)));
                                            }
                                    }
                                    if(SurPix > 3){
                                            Pix[r][c].r = (RrSum /
(float)SurPix);
                                    }
                                    SurPix = 0;
                                    RrSum = 0.0f;
                            }
                        }
                    }
```

FIG. 27b

```
                        Loop++;
```

```
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                }
        } if(loopcursor == 1){
                /*     Point error  */
                for(int row = 1; row < numRows - 1; row++){
                        for(int col = 1; col < numCols - 1; col++){
                                Rr = Pix[row][col].r;
                                if(Rr > 0.2f && Rr < 119.9f){
                                        RrSur = Pix[row - 1][col + 1].r;     /*
    Changes       */
                                        impact = (int)(Rr + 100.f / Resolution);
                                        RrNew = ((Rr * (impact + loop)) + RrSur) /
(impact + loop + 1);

if(RrNew > Pix[row][col].rs && RrNew <
Pix[row][col].rl){
                                                Pix[row][col].r = RrNew;
                                        }
                                        if(RrNew <= Pix[row][col].rs){
                                                Pix[row][col].r = (Pix[row][col].rl +
Pix[row][col].rl + Pix[row][col].rs) /  3.f;
                                        }
                                        if(RrNew >= Pix[row][col].rl){
                                                Pix[row][col].r = (Pix[row][col].rl +
Pix[row][col].rs + Pix[row][col].rs) /  3.f;
                                        }
                                }
                        }
                }
                Loop++;
                if(_ActiveFrame == 0 || _ActiveFrame == 2){
                        m_wndStatusBar.SetPaneProgress(5,
ReferenceScanProperties.Loop, true);
                }
                if(_ActiveFrame == 1 || _ActiveFrame == 3){
                        m_wndStatusBar.SetPaneProgress(5,
DynamicScanProperties.Loop, true);
                }
        }
```

FIG. 27c

```
/*      Pixel neighbour error      */
for(int c = numCols - 2; c > 1; c--){
    for(int r = numRows - 2; r > 1; r--){
        RrOld = Pix[r][c].r;
        if(RrOld > 0.2f && RrOld < 119.9f){
            diff[0] = RrOld - Pix[r - 1][c - 1].r;
            diff[1] = RrOld - Pix[r - 1][c].r;
            diff[2] = RrOld - Pix[r - 1][c + 1].r;
            diff[3] = RrOld - Pix[r][c - 1].r;
            diff[4] = RrOld - Pix[r][c + 1].r;
            diff[5] = RrOld - Pix[r + 1][c - 1].r;
            diff[6] = RrOld - Pix[r + 1][c].r;
            diff[7] = RrOld - Pix[r + 1][c + 1].r;

osc = ((pow(Resolution, Third) / 2.f) + (Rr
/ 100.f)) / 1000.f;

for(int s = 0; s < 8; s++){
                if(fabs(diff[s]) <= osc){
                    SurPix = SurPix + 1;
                    RrSum = RrSum + (RrOld -
(diff[s] / (loop + 1 * RrOld)));
                }
            }
            if(SurPix > 3){
                Pix[r][c].r = (RrSum /
(float)SurPix);
            }
            SurPix = 0;
            RrSum = 0.0f;
        }
    }
    Loop++;
    if(_ActiveFrame == 0 || _ActiveFrame == 2){
        m_wndStatusBar.SetPaneProgress(5,
ReferenceScanProperties.Loop, true);
    }
    if(_ActiveFrame == 1 || _ActiveFrame == 3){
        m_wndStatusBar.SetPaneProgress(5,
DynamicScanProperties.Loop, true);
    }
}
} if(loopcursor == 2){
    /*      Point error */
    for(int row = 1; row < numRows - 1; row++){
        for(int col = 1; col < numCols - 1; col++){
            Rr = Pix[row][col].r;
            if(Rr > 0.2f && Rr < 119.9f){
                RrSur = Pix[row][col - 1].r;    /*
Changes         */
```

FIG. 27d

```
                                        impact = (int)(Rr + 100.f / Resolution);
                                        RrNew = ((Rr * (impact + loop)) + RrSur) /
(impact + loop + 1);

if(RrNew > Pix[row][col].rs && RrNew <
Pix[row][col].rl){
                                                Pix[row][col].r = RrNew;
                                        }
                                        if(RrNew <= Pix[row][col].rs){
                                                Pix[row][col].r = (Pix[row][col].rl +
Pix[row][col].rl + Pix[row][col].rs) / 3.f;
                                        }
                                        if(RrNew >= Pix[row][col].rl){
                                                Pix[row][col].r = (Pix[row][col].rl +
Pix[row][col].rs + Pix[row][col].rs) / 3.f;
                                        }
                                }
                        }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                }

/*      Pixel neighbour error      */
                for(int r = numRows - 2; r > 1; r--){
                        for(int c = 1; c < numCols - 1; c++){ /*      Nesting
swapped       */
                                RrOld = Pix[r][c].r;
                                if(RrOld > 0.2f && RrOld < 119.9f){
                                        diff[0] = RrOld - Pix[r - 1][c - 1].r;
                                        diff[1] = RrOld - Pix[r - 1][c].r;
                                        diff[2] = RrOld - Pix[r - 1][c + 1].r;
                                        diff[3] = RrOld - Pix[r][c - 1].r;
                                        diff[4] = RrOld - Pix[r][c + 1].r;
                                        diff[5] = RrOld - Pix[r + 1][c - 1].r;
                                        diff[6] = RrOld - Pix[r + 1][c].r;
                                        diff[7] = RrOld - Pix[r + 1][c + 1].r;

osc = ((pow(Resolution, Third) / 2.f) + (Rr
/ 100.f)) / 1000.f;

for(int s = 0; s < 8; s++){
                                                if(fabs(diff[s]) <= osc){
                                                        SurPix = SurPix + 1;
                                                        RrSum = RrSum + (RrOld -
(diff[s] / (loop + 1 * RrOld)));
                                                }
                                        }
```

FIG. 27e

```
                                        if(SurPix > 3){
                                                Pix[r][c].r = (RrSum /
(float)SurPix);
                                        }
                                        SurPix = 0;
                                        RrSum = 0.0f;
                                }
                        }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                }
        } if(loopcursor == 3){
                /*      Point error     */
                for(int row = 1; row < numRows - 1; row++){
                        for(int col = 1; col < numCols - 1; col++){
                                Rr = Pix[row][col].r;
                                if(Rr > 0.2f && Rr < 119.9f){
                                        RrSur = Pix[row - 1][col - 1].r;         /*
        Changes         */
                                        impact = (int)(Rr + 100.f / Resolution);
                                        RrNew = ((Rr * (impact + loop)) + RrSur) /
(impact + loop + 1);

if(RrNew > Pix[row][col].rs && RrNew <
Pix[row][col].rl){
                                                Pix[row][col].r = RrNew;
                                        }
                                        if(RrNew <= Pix[row][col].rs){
                                                Pix[row][col].r = (Pix[row][col].rl +
Pix[row][col].rl + Pix[row][col].rs) / 3.f;
                                        }
                                        if(RrNew >= Pix[row][col].rl){
                                                Pix[row][col].r = (Pix[row][col].rl +
Pix[row][col].rs + Pix[row][col].rs) / 3.f;
                                        }
                                }
                        }
                }
                Loop++;
                if(_ActiveFrame == 0 || _ActiveFrame == 2){
                        m_wndStatusBar.SetPaneProgress(5,
ReferenceScanProperties.Loop, true);
                }
                if(_ActiveFrame == 1 || _ActiveFrame == 3){
                        m_wndStatusBar.SetPaneProgress(5,
DynamicScanProperties.Loop, true);
                }
        }
```

FIG. 27f

```
/*      Pixel neighbour error       */
                for(int r = 1; r < numRows - 1; r++){
                        for(int c = numCols - 2; c > 1; c--){     /*      Nesting
swapped         */
                                RrOld = Pix[r][c].r;
                                if(RrOld > 0.2f && RrOld < 119.9f){
                                        diff[0] = RrOld - Pix[r - 1][c - 1].r;
                                        diff[1] = RrOld - Pix[r - 1][c].r;
                                        diff[2] = RrOld - Pix[r - 1][c + 1].r;
                                        diff[3] = RrOld - Pix[r][c - 1].r;
                                        diff[4] = RrOld - Pix[r][c + 1].r;
                                        diff[5] = RrOld - Pix[r + 1][c - 1].r;
                                        diff[6] = RrOld - Pix[r + 1][c].r;
                                        diff[7] = RrOld - Pix[r + 1][c + 1].r;

osc = ((pow(Resolution, Third) / 2.f) + (Rr /
100.f)) / 1000.f;

for(int s = 0; s < 8; s++){
                                                if(fabs(diff[s]) <= osc){
                                                        SurPix = SurPix + 1;
                                                        RrSum = RrSum + (RrOld - (diff[s]
/ (loop + 1 * RrOld)));
                                                }
                                        }
                                        if(SurPix > 3){
                                                Pix[r][c].r = (RrSum / (float)SurPix);
                                        }
                                        SurPix = 0;
                                        RrSum = 0.0f;
                                }
                        }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                }
        } if(loopcursor == 4){
                /*      Point error     */
                for(int row = 1; row < numRows - 1; row++){
                        for(int col = 1; col < numCols - 1; col++){
                                Rr = Pix[row][col].r;
                                if(Rr > 0.2f && Rr < 119.9f){
                                        RrSur = Pix[row][col + 1].r;        /*
        Changes         */
                                        impact = (int)(Rr + 100.f / Resolution);
                                        RrNew = ((Rr * (impact + loop)) + RrSur) /
(impact + loop + 1);
```

FIG. 27g

```
                                    if(RrNew > Pix[row][col].rs && RrNew <
Pix[row][col].rl){
                                            Pix[row][col].r = RrNew;
                                    }
                                    if(RrNew <- Pix[row][col].rs){
                                            Pix[row][col].r = (Pix[row][col].rl +
Pix[row][col].rl + Pix[row][col].rs) / 3.f;
                                    }
                                    if(RrNew >= Pix[row][col].rl){
                                            Pix[row][col].r = (Pix[row][col].rl +
Pix[row][col].rs + Pix[row][col].rs) / 3.f;
                                    }
                                }
                            }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                    }

/*   Pixel neighbour error    */
                    for(int c = numCols - 2; c > 1; c--){
                        for(int r = 1; r < numRows - 1; r++){
                            RrOld = Pix[r][c].r;
                            if(RrOld > 0.2f && RrOld < 119.9f){
                                    diff[0] = RrOld - Pix[r - 1][c - 1].r;
                                    diff[1] = RrOld - Pix[r - 1][c].r;
                                    diff[2] = RrOld - Pix[r - 1][c + 1].r;
                                    diff[3] = RrOld - Pix[r][c - 1].r;
                                    diff[4] = RrOld - Pix[r][c + 1].r;
                                    diff[5] = RrOld - Pix[r + 1][c - 1].r;
                                    diff[6] = RrOld - Pix[r + 1][c].r;
                                    diff[7] = RrOld - Pix[r + 1][c + 1].r;

osc = ((pow(Resolution, Third) / 2.f) + (Rr
/ 100.f)) / 1000.f;

for(int s = 0; s < 8; s++){
                                            if(fabs(diff[s]) <= osc){
                                                    SurPix = SurPix + 1;
                                                    RrSum = RrSum + (RrOld -
(diff[s] / (loop + 1 * RrOld)));
                                            }
                                    }
```

FIG. 27h

```
                                        if(SurPix > 3){
                                                Pix[r][c].r = (RrSum /
(float)SurPix);
                                        }
                                        SurPix = 0;
                                        RrSum = 0.0f;
                                }
                        }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                }
        } if(loopcursor == 5){
                /*      Point error     */
                for(int row = 1; row < numRows - 1; row++){
                        for(int col = 1; col < numCols - 1; col++){
                                Rr = Pix[row][col].r;
                                if(Rr > 0.2f && Rr < 119.9f){
                                        RrSur = Pix[row + 1][col + 1].r;         /*
        Changes         */
                                        impact = (int)(Rr + 100.f / Resolution);
                                        RrNew = ((Rr * (impact + loop)) + RrSur) /
(impact + loop + 1);

if(RrNew > Pix[row][col].rs && RrNew <
Pix[row][col].rl){
                                                Pix[row][col].r = RrNew;
                                        }
                                        if(RrNew <= Pix[row][col].rs){
                                                Pix[row][col].r = (Pix[row][col].rl +
Pix[row][col].rl + Pix[row][col].rs) / 3.f;
                                        }
                                        if(RrNew >= Pix[row][col].rl){
                                                Pix[row][col].r = (Pix[row][col].rl +
Pix[row][col].rs + Pix[row][col].rs) / 3.f;
                                        }
                                }
                        }
                }
                Loop++;
                if(_ActiveFrame == 0 || _ActiveFrame == 2){
                        m_wndStatusBar.SetPaneProgress(5,
ReferenceScanProperties.Loop, true);
                }
                if(_ActiveFrame == 1 || _ActiveFrame == 3){
                        m_wndStatusBar.SetPaneProgress(5,
DynamicScanProperties.Loop, true);
                }
        }
```

FIG. 27i

```
/*    Pixel neighbour error    */
          for(int c = 1; c < numCols - 1; c++){
               for(int r = numRows - 2; r > 1; r--){
                    RrOld = Pix[r][c].r;
                    if(RrOld > 0.2f && RrOld < 119.9f){
                         diff[0] = RrOld - Pix[r - 1][c - 1].r;
                         diff[1] = RrOld - Pix[r - 1][c].r;
                         diff[2] = RrOld - Pix[r - 1][c + 1].r;
                         diff[3] = RrOld - Pix[r][c - 1].r;
                         diff[4] = RrOld - Pix[r][c + 1].r;
                         diff[5] = RrOld - Pix[r + 1][c - 1].r;
                         diff[6] = RrOld - Pix[r + 1][c].r;
                         diff[7] = RrOld - Pix[r + 1][c + 1].r;

osc = ((pow(Resolution, Third) / 2.f) + (Rr
/ 100.f)) / 1000.f;

for(int s = 0; s < 8; s++){
                              if(fabs(diff[s]) <= osc){
                                   SurPix = SurPix + 1;
                                   RrSum = RrSum + (RrOld -
(diff[s] / (loop + 1 * RrOld)));
                              }
                         }
                         if(SurPix > 3){
                              Pix[r][c].r = (RrSum /
(float)SurPix);
                         }
                         SurPix = 0;
                         RrSum = 0.0f;
                    }
               }
               Loop++;
               if(_ActiveFrame == 0 || _ActiveFrame == 2){
                    m_wndStatusBar.SetPaneProgress(5,
ReferenceScanProperties.Loop, true);
               }
               if(_ActiveFrame == 1 || _ActiveFrame == 3){
                    m_wndStatusBar.SetPaneProgress(5,
DynamicScanProperties.Loop, true);
               }
          }
     } if(loopcursor == 6){
          /*    Point error    */
          for(int row = 1; row < numRows - 1; row++){
               for(int col = 1; col < numCols - 1; col++){
                    Rr = Pix[row][col].r;
                    if(Rr > 0.2f && Rr < 119.9f){
                         RrSur = Pix[row + 1][col].r;    /*
     Changes         */
                         impact = (int)(Rr + 100.f / Resolution);
                         RrNew = ((Rr * (impact + loop)) + RrSur) /
(impact + loop + 1);
```

FIG. 27j

```
                                        if(RrNew > Pix[row][col].rs && RrNew <
Pix[row][col].rl){
                                                Pix[row][col].r = RrNew;
                                        }
                                        if(RrNew <- Pix[row][col].rs){
                                                Pix[row][col].r = (Pix[row][col].rl +
Pix[row][col].rl + Pix[row][col].rs) / 3.f;
                                        }
                                        if(RrNew >= Pix[row][col].rl){
                                                Pix[row][col].r = (Pix[row][col].rl +
Pix[row][col].rs + Pix[row][col].rs) / 3.f;
                                        }
                                }
                        }
                        Loop++;
                        if(_ActiveFrame == 0 || _ActiveFrame == 2){
                                m_wndStatusBar.SetPaneProgress(5,
ReferenceScanProperties.Loop, true);
                        }
                        if(_ActiveFrame == 1 || _ActiveFrame == 3){
                                m_wndStatusBar.SetPaneProgress(5,
DynamicScanProperties.Loop, true);
                        }
                }

/*      Pixel neighbour error    */
                for(int r = numRows - 2; r > 1; r--){
                        for(int c = numCols - 2; c > 1; c--){  /*     Nesting
swapped         */
                                RrOld = Pix[r][c].r;
                                if(RrOld > 0.2f && RrOld < 119.9f){
                                        diff[0] = RrOld - Pix[r - 1][c - 1].r;
                                        diff[1] = RrOld - Pix[r - 1][c].r;
                                        diff[2] = RrOld - Pix[r - 1][c + 1].r;
                                        diff[3] = RrOld - Pix[r][c - 1].r;
                                        diff[4] = RrOld - Pix[r][c + 1].r;
                                        diff[5] = RrOld - Pix[r + 1][c - 1].r;
                                        diff[6] = RrOld - Pix[r + 1][c].r;
                                        diff[7] = RrOld - Pix[r + 1][c + 1].r;

osc = ((pow(Resolution, Third) / 2.f) + (Rr
/ 100.f)) / 1000.f;

for(int s = 0; s < 8; s++){
                                                if(fabs(diff[s]) <= osc){
                                                        SurPix = SurPix + 1;
                                                        RrSum = RrSum + (RrOld -
(diff[s] / (loop + 1 * RrOld)));
                                                }
                                        }
```

FIG. 27k

```
                                if(SurPix > 3){
                                        Pix[r][c].r = (RrSum /
(float)SurPix);
                                }
                                SurPix = 0;
                                RrSum = 0.0f;
                        }
                }
                Loop++;
                if(_ActiveFrame == 0 || _ActiveFrame == 2){
                        m_wndStatusBar.SetPaneProgress(5,
ReferenceScanProperties.Loop, true);
                }
                if(_ActiveFrame == 1 || _ActiveFrame == 3){
                        m_wndStatusBar.SetPaneProgress(5,
DynamicScanProperties.Loop, true);
                }
            }

} if(loopcursor == 7){
                /*    Point error   */
                for(int row = 1; row < numRows - 1; row++){
                        for(int col = 1; col < numCols - 1; col++){
                                Rr = Pix[row][col].r;
                                if(Rr > 0.2f && Rr < 119.9f){
                                        RrSur = Pix[row + 1][col - 1].r;       /*
    Changes        */
                                        impact = (int)(Rr + 100.f / Resolution);
                                        RrNew = ((Rr * (impact + loop)) + RrSur) /
(impact + loop + 1);

if(RrNew > Pix[row][col].rs && RrNew <
Pix[row][col].rl){
                                                Pix[row][col].r = RrNew;
                                        }
                                        if(RrNew <= Pix[row][col].rs){
                                                Pix[row][col].r = (Pix[row][col].rl +
Pix[row][col].rl + Pix[row][col].rs) /  3.f;
                                        }
                                        if(RrNew >= Pix[row][col].rl){
                                                Pix[row][col].r = (Pix[row][col].rl +
Pix[row][col].rs + Pix[row][col].rs) /  3.f;
                                        }
                                }
                        }
                }
                Loop++;
                if(_ActiveFrame == 0 || _ActiveFrame == 2){
                        m_wndStatusBar.SetPaneProgress(5,
ReferenceScanProperties.Loop, true);
                }
```

FIG. 27l

```
                              if(_ActiveFrame == 1 || _ActiveFrame == 3){
                                    m_wndStatusBar.SetPaneProgress(5,
DynamicScanProperties.Loop, true);
                              }
                       }

/*    Pixel neighbour error    */
                       if(loop != Resolution - 1){
                              /*   Don't use last pixel neighbor to ensure points
stay within noise band    */
                              for(int r = 1; r < numRows - 1; r++){
                                    for(int c = 1; c < numCols - 1; c++){ /*
      Nesting swapped      */
                                            RrOld = Pix[r][c].r;
                                            if(RrOld > 0.2f && RrOld < 119.9f){
                                                   diff[0] = RrOld - Pix[r - 1][c -
1].r;
                                                   diff[1] = RrOld - Pix[r - 1][c].r;
                                                   diff[2] = RrOld - Pix[r - 1][c +
1].r;
                                                   diff[3] = RrOld - Pix[r][c - 1].r;
                                                   diff[4] = RrOld - Pix[r][c + 1].r;
                                                   diff[5] = RrOld - Pix[r + 1][c -
1].r;
                                                   diff[6] = RrOld - Pix[r + 1][c].r;
                                                   diff[7] = RrOld - Pix[r + 1][c +
1].r;

osc = ((pow(Resolution, Third) / 2.f)
+ (Rr / 100.f)) / 1000.f;

for(int s = 0; s < 8; s++){
                                                          if(fabs(diff[s]) <= osc){
                                                                 SurPix = SurPix + 1;
                                                                 RrSum = RrSum + (RrOld -
(diff[s] / (loop + 1 * RrOld)));
                                                          }
                                                   }
                                                   if(SurPix > 3){
                                                          Pix[r][c].r = (RrSum /
(float)SurPix);
                                                   }
                                                   SurPix = 0;
                                                   RrSum = 0.0f;
                                            }
                                    }
                              Loop++;
                              if(_ActiveFrame == 0 || _ActiveFrame == 2){
                                    m_wndStatusBar.SetPaneProgress(5,
ReferenceScanProperties.Loop, true);
                              }
                              if(_ActiveFrame == 1 || _ActiveFrame == 3){
                                    m_wndStatusBar.SetPaneProgress(5,
DynamicScanProperties.Loop, true);
                              }
                       }
                }
         }
      }
```

FIG. 27m

```
/*   Remove scan border points as they are not assessed
     - Pick.cpp borders have been changed accordingly   */
for(int r = 0; r < numRows; r++){
    Pix[r][0].NoisyR - 0.f;
    Pix[r][0].r = 0.f;
    Pix[r][0].p = 0.f;
    Pix[r][0].t = 0.f;
    Pix[r][numCols - 1].r = 0.f;
    Pix[r][numCols - 1].p = 0.f;
    Pix[r][numCols - 1].t = 0.f;
} for(int c = 0; c < numCols; c++){
    Pix[0][c].NoisyR = 0.f;
    Pix[0][c].r = 0.f;
    Pix[0][c].p = 0.f;
    Pix[0][c].t = 0.f;
    Pix[numRows - 1][c].r = 0.f;
    Pix[numRows - 1][c].p = 0.f;
    Pix[numRows - 1][c].t = 0.f;
}
}
```

FIG. 27n

```
void CMainFrame::DeleteScatterError(int numRows, int numCols,
vector<vector<Pixel>>& Pix, float &Resolution)
{
      int SurPix = 0;
      float _R;
      float osc;
      BYTE RGB;
      float diff[8];
      float Third = 1.f / 3.f;
      int IsolatedPos;
      int IsolatedNeg;

/*    Settings    */
      int MarkForDeletion;
      int NeigborCount;

if(Resolution >= 30){
            MarkForDeletion = 4;
            NeigborCount = 8;
      }
      if(Resolution >= 20 && Resolution < 30){
            MarkForDeletion = 3;
            NeigborCount = 7;
      }
      if(Resolution < 20){
            MarkForDeletion = 2;
            NeigborCount = 7;
      }
```

FIG. 28a

```
/*   Based on neighbouring points    */
for(int c = 1; c < numCols - 1; c++){
    for(int r = 1; r < numRows - 1; r++){
        _R = Pix[r][c].r;
        if(_R > 0.2f && _R < 119.9f){
            RGB = Pix[r][c].red;

diff[0] = _R - Pix[r - 1][c - 1].r;
            diff[1] = _R - Pix[r - 1][c].r;
            diff[2] = _R - Pix[r - 1][c + 1].r;
            diff[3] = _R - Pix[r][c - 1].r;
            diff[4] = _R - Pix[r][c + 1].r;
            diff[5] = _R - Pix[r + 1][c - 1].r;
            diff[6] = _R - Pix[r + 1][c].r;
            diff[7] = _R - Pix[r + 1][c + 1].r;

osc = ((pow(Resolution, Third) / 2.f) + _R) / 1000.f;
            if(Resolution >= 30){
                osc = osc * (0.2f + ((float)ScannerQuality *
0.1f));     //    0.4 normal 0.2 flat and more scatter error deleted 0.6 less
deleted
            }
            if(Resolution >= 20 && Resolution < 30){
                osc = osc * (0.6f + ((float)ScannerQuality *
0.2f));     //    1.0 normal 0.6 flat and more scatter error deleted 1.4 less
deleted
            }
            if(Resolution < 20){
                osc = osc * (2.0f + ((float)ScannerQuality *
0.5f));     //    2.0 normal 1.0 flat and more scatter error deleted 3.0 less
deleted
            } for(int s = 0; s < 8; s++){
                if(fabs(diff[s]) <= osc){
                    SurPix = SurPix + 1;
                }
            }

/*    Mark for deletion   */
            if(_R < 1.f){
                if(SurPix < NeigborCount){
                    Pix[r][c].rs = 10000.f ;
                }
                /*    Intensity clearout */
                if(RGB < 1){
                    Pix[r][c].rs = 10000.f ;
                }
            }
            if(_R >= 1.f && _R < 2.f){
                if(SurPix < NeigborCount - 1){
                    Pix[r][c].rs = 10000.f ;
                }
                if(RGB < 1){
                    Pix[r][c].rs = 10000.f ;
                }
            }
```

FIG. 28b

```
                    if(_R >= 2.f && _R < 3.f){
                        if(SurPix < NeigborCount - 2){
                            Pix[r][c].rs = 10000.f ;
                        }
                        if(RGB < 1){
                            Pix[r][c].rs = 10000.f ;
                        }
                    }
                    if(_R >= 3.f && _R < 4.f){
                        if(SurPix < NeigborCount - 3){
                            Pix[r][c].rs = 10000.f ;
                        }
                        if(RGB < 1){
                            Pix[r][c].rs = 10000.f ;
                        }
                    }
                    if(_R >= 4.f && _R < 5.f){
                        if(SurPix < NeigborCount - 4){
                            Pix[r][c].rs = 10000.f ;
                        }
                        if(RGB < 1){
                            Pix[r][c].rs = 10000.f ;
                        }
                    }
                    if(_R >= 5.f){
                        if(SurPix < NeigborCount - 5){
                            Pix[r][c].rs = 10000.f ;
                        }
                    }
                    SurPix = 0;
            }
        }
}

/*    Delete marked      */
for(int c = 1; c < numCols - 1; c++){
    for(int r = 1; r < numRows - 1; r++){
        if(Pix[r][c].rs > 9999.f){
            Pix[r][c].r = 0.f;
        }
    }
}

/*    Based on point close proximity  */
for(int c = 1; c < numCols - 1; c++){
    for(int r = 1; r < numRows - 1; r++){
        _R = Pix[r][c].r;
        if(_R > 0.2f && _R < 119.9f){
            RGB = Pix[r][c].red;
```

FIG. 28c

```
                        IsolatedPos = IsolatedNeg = 0;
                        diff[0] = _R - Pix[r - 1][c - 1].r;
                        diff[1] = _R - Pix[r - 1][c].r;
                        diff[2] = _R - Pix[r - 1][c + 1].r;
                        diff[3] = _R - Pix[r][c - 1].r;
                        diff[4] = _R - Pix[r][c + 1].r;
                        diff[5] = _R - Pix[r + 1][c - 1].r;
                        diff[6] = _R - Pix[r + 1][c].r;
                        diff[7] = _R - Pix[r + 1][c + 1].r;

for(int s = 0; s < 8; s++){
                            if(diff[s] <= 0.f){
                                IsolatedPos++;
                            }
                            if(diff[s] >= 0.f){
                                IsolatedNeg++;
                            }
                        }

/*    Mark for deletion   */
                        if(IsolatedPos < MarkForDeletion || IsolatedNeg <
MarkForDeletion){
                            Pix[r][c].rs = 10000.f;
                        }
                    }
                }
            }

/*    Delete marked      */
    for(int c = 1; c < numCols - 1; c++){
        for(int r = 1; r < numRows - 1; r++){
            if(Pix[r][c].rs > 9999.f){
                Pix[r][c].r = 0.f;
            }
        }
    }
}
```

FIG. 28d

SYSTEM FOR SMOOTHING 3D CLOUDS

CROSS-REFERENCE TO RELATED APPLICATIONS

This application is a continuation of U.S. patent application Ser. No. 14/166,840 filed Jan. 28, 2014 which is a continuation-in-part of U.S. patent application Ser. No. 13/532,691 filed Jun. 25, 2012, the disclosures of which are hereby incorporated by reference thereto.

TECHNICAL FIELD

The invention relates to apparatus and methods for generating! for example in three dimensions, a surface contour representation of a surface or portion thereof from a three dimensional scan file forming a point cloud data set.

STATEMENT REGARDING FEDERALLY SPONSORED RESEARCH OR DEVELOPMENT (Not applicable)

BACKGROUND OF THE INVENTION

Although 3D laser scanners are improving in quality, the point cloud scan files obtained from 3D scanners do not accurately represent the true dimensions of the actual object due to various types of noise such as statistical noise and false scatter points.

Laser scanner technicians have developed methods using registration markers in various forms or shapes known within the software of the laser scanner to aid in accurate measurement with little success. Even with the use of these objects, such as a sphere designed to be fully recognized by the scanner, the point cloud is not accurately represented and, instead, is distorted.

Aside from attempts to fine tune the laser scanners themselves, when tools designed to measure between scan points are utilized, they also fail to show the full expected field of view and oftentimes deviate by a significant amount It is recognized that some 3D images need smoothing in order to take accurate measurements of an object; however, these smoothing techniques distort and/or diminish the density of the original scan data. Other attempts do not rid the image of statistical noise to a high enough degree to be useful for small measurements. Another shortfall of typical 3D scans is the amount of scatter points and surface roughness included in scan files which mask the true shape of the object being measured. For example, if minute measurements are needed to monitor the deformation of an object to determine whether the structural integrity has been compromised for engineering purposes, this cannot be done to a high degree of certainty with various forms of noise present and, currently, the software and techniques for tuning the laser scanners do not provide adequate images.

SUMMARY OF THE INVENTION

In accordance with the invention, a method for processing an array of pixels in a point cloud, comprising calculating local error limits for each distance value £ or each pixel in the processed point cloud data set is provided. The method further comprises determining the error bar. One begins a distance value adjusting loop by for each pixel in the processed point cloud data set by calculating the difference between the distance value in the pixel of the point cloud data set being processed and each of the neighboring pixels or the most suitable neighboring pixel distance value is determined whether the difference is within the range defined by the error bar. It the difference is not within the error bar; the distance value is changed for the pixel being processed by a small fraction while keeping the new distance value within the range defined by the original distance value for the pixel being processed plus or minus the error bar. If the difference is within the error bar the distance value in the pixel being processed is replaced by a weighted average value. The number of neighboring pixels with their distance values within the error bar for the pixel being processed is counted and if the count is greater than a predetermined threshold, average the counted distance values and substitute the average for the pixel distance value, but if the count is below the threshold leave the pixel distance value unchanged. It is determined whether loop exit criteria have been met and if loop exit criteria have not been met beginning the loop again, and if loop exit criteria have been met, terminating the loop.

BRIEF DESCRIPTION THE DRAWINGS

The operation of the inventive method will become apparent from the following description taken in conjunction with the drawings, in which.

Figure 12:
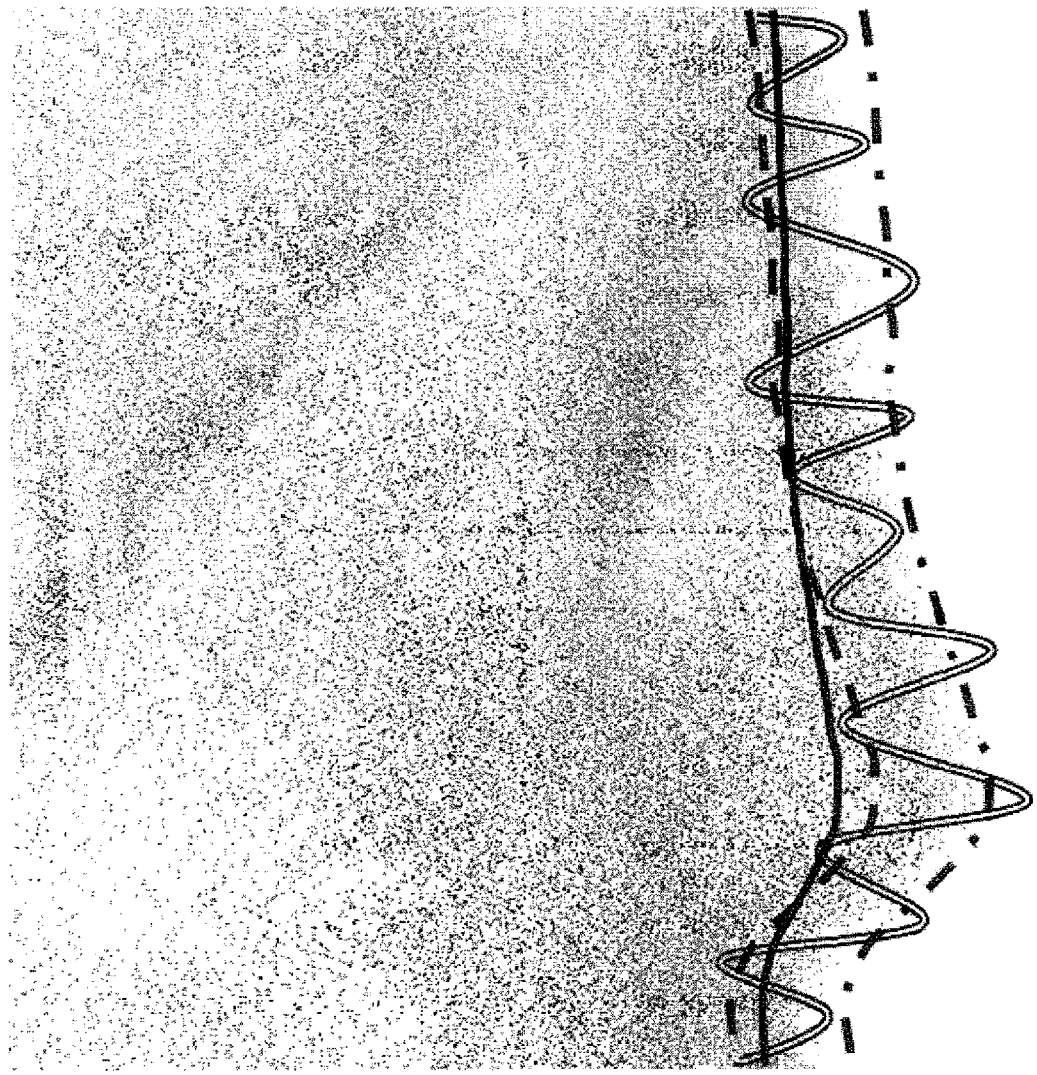
Figure 13:
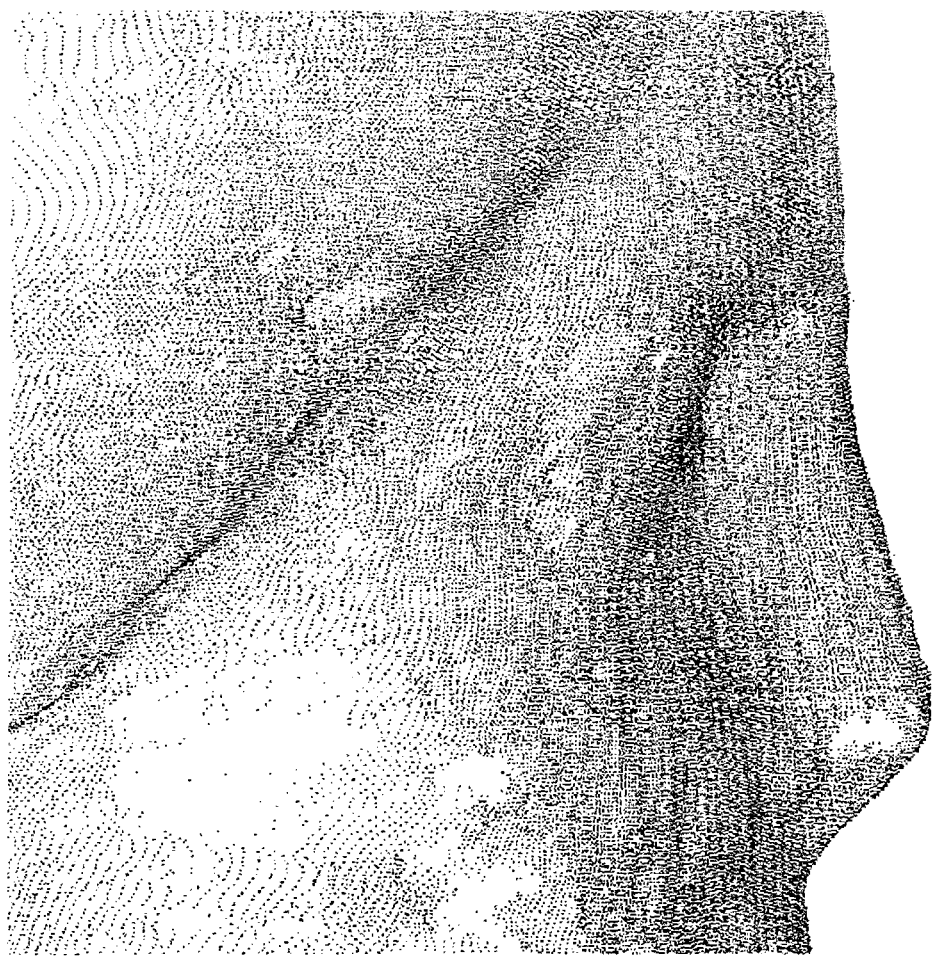
Figure 14:
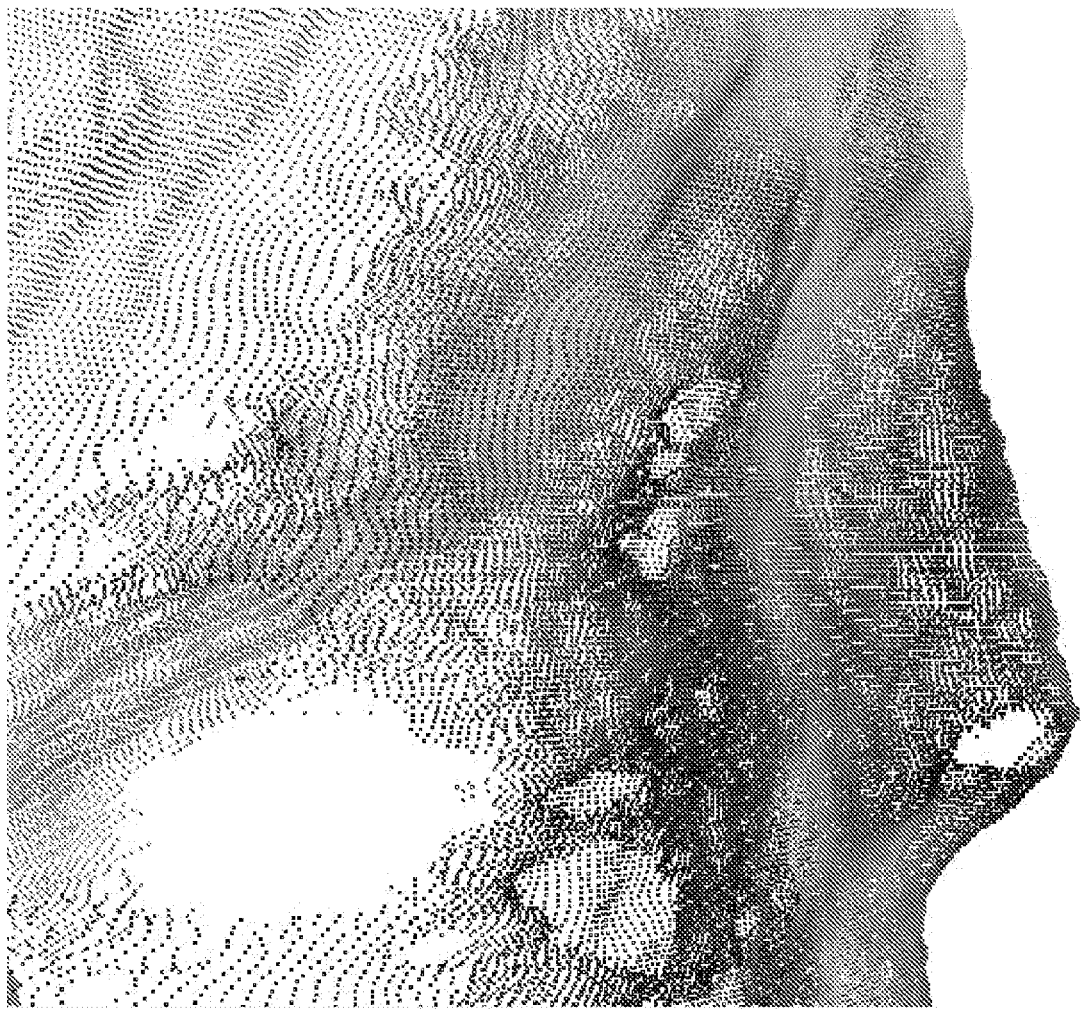
Figure 15:
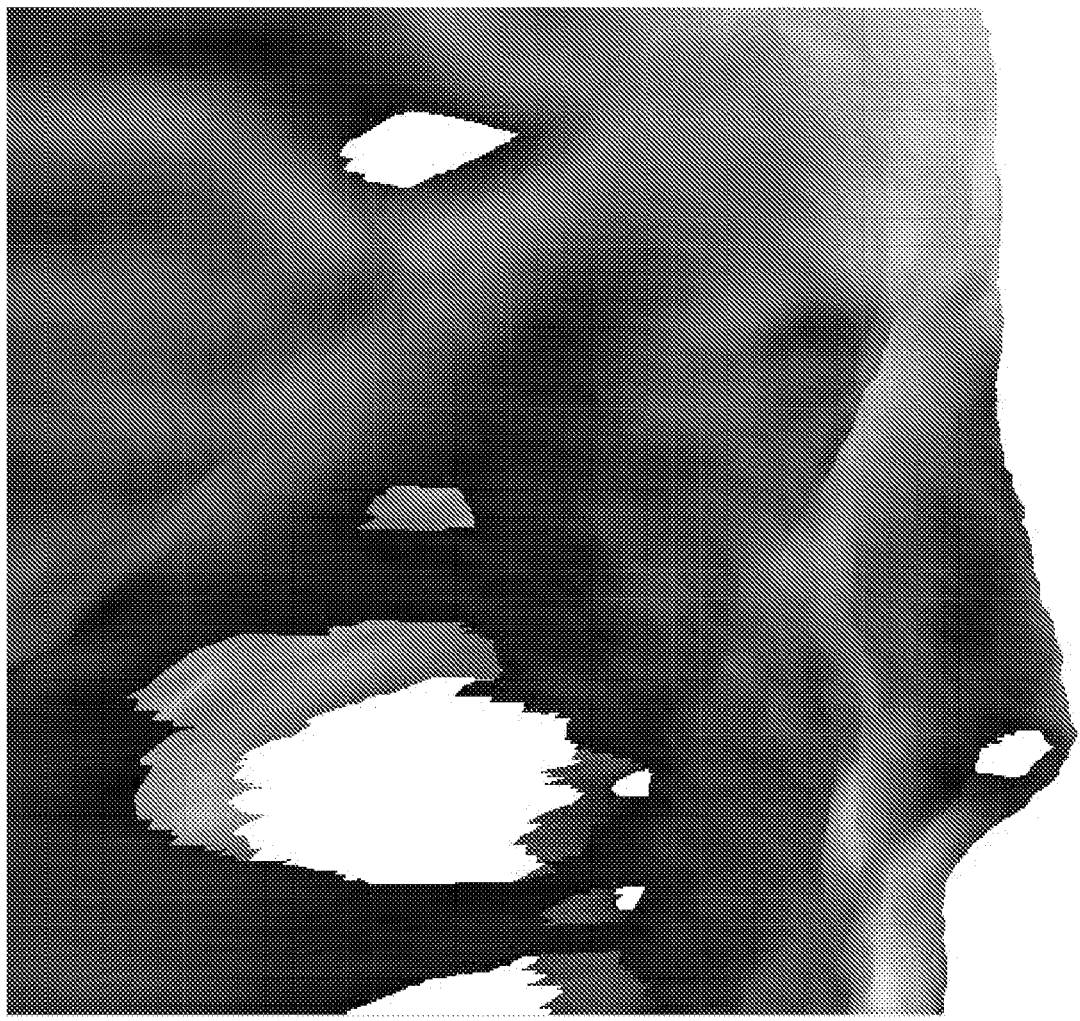
Figure 16:
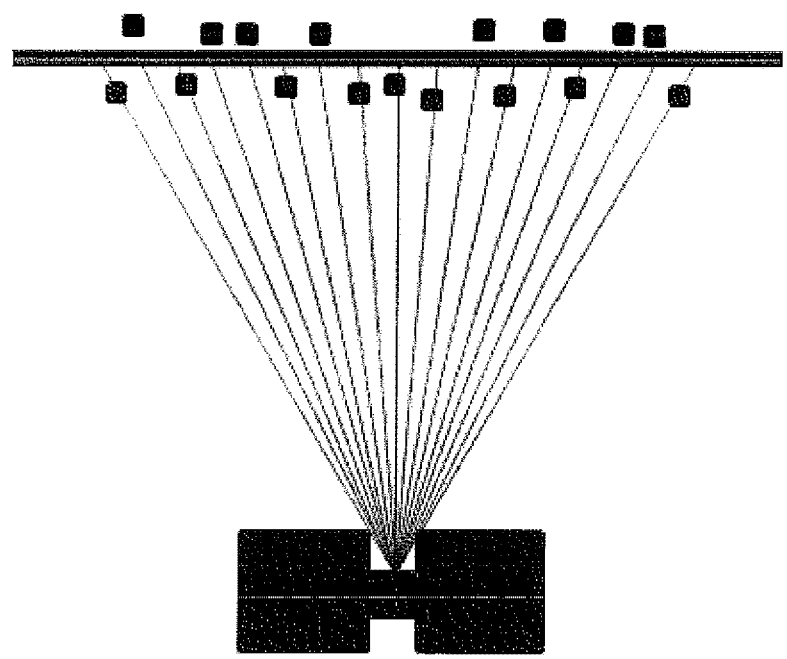
Figure 17:
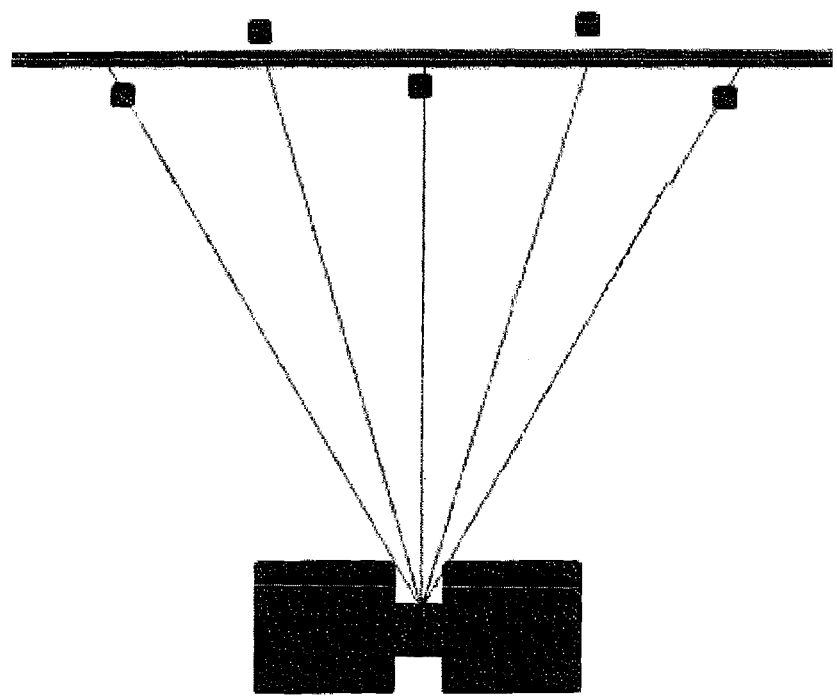
Figure 18:
Figure 18:
Figure 19:
Figure 19:
Figure 20:
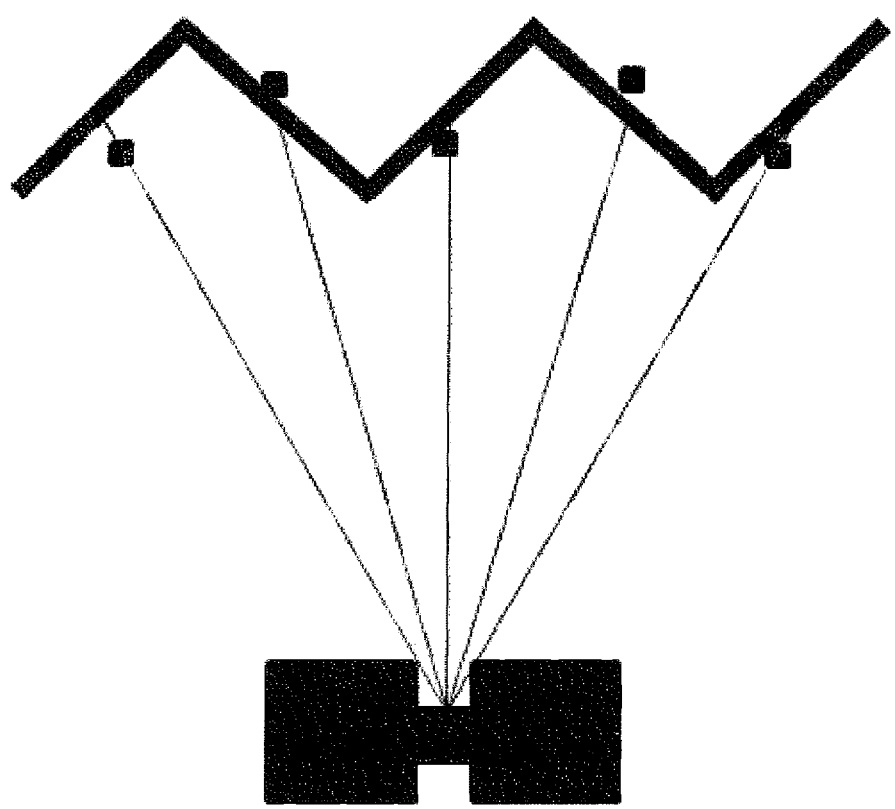
Figure 21:
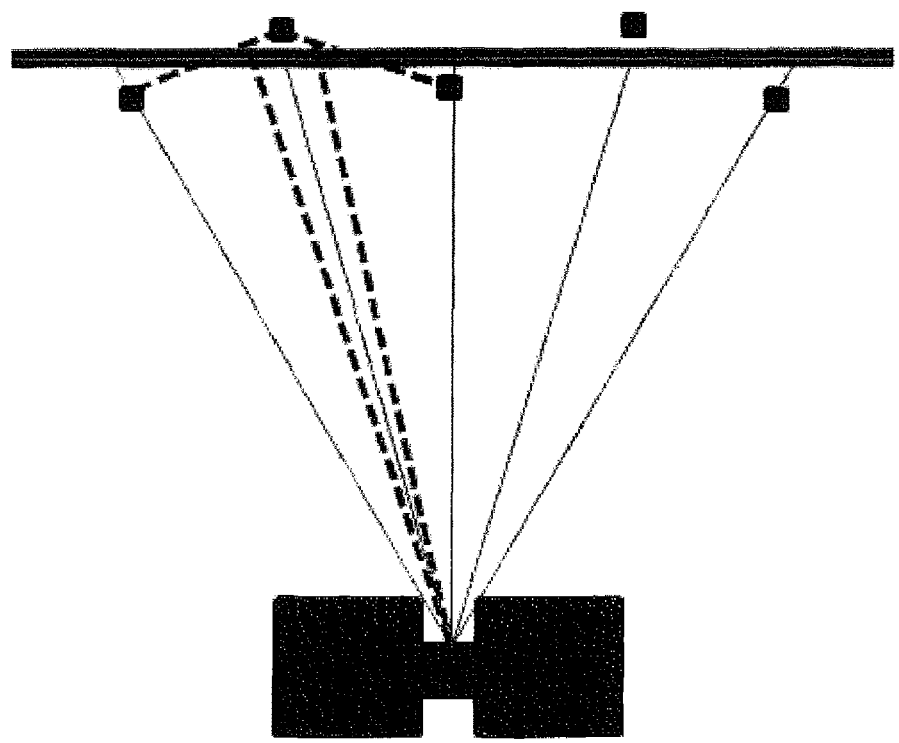
Figure 22:
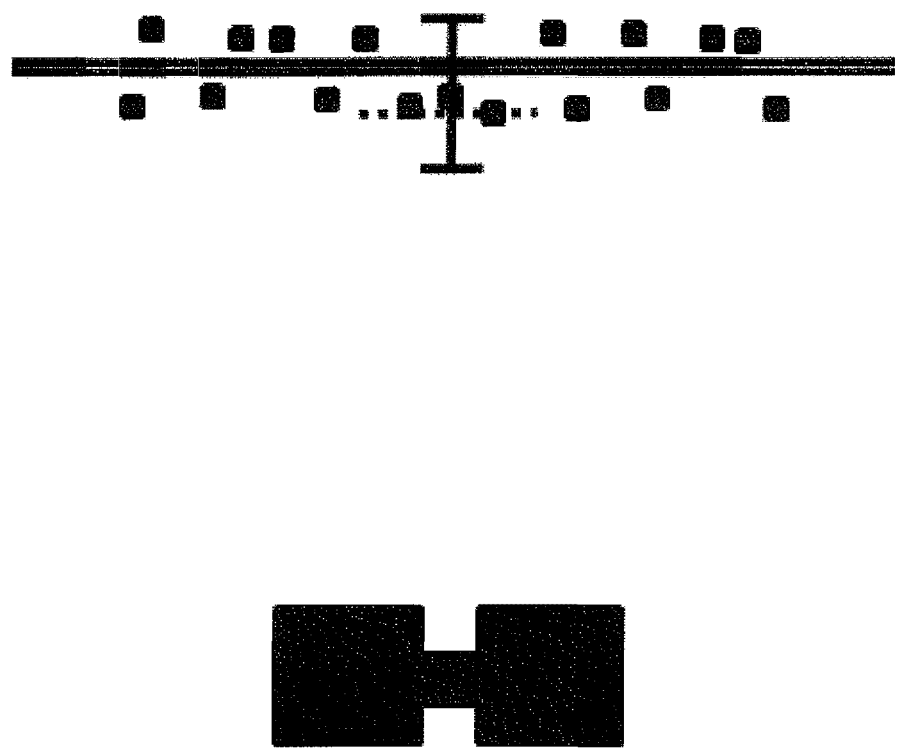

FIG. 12 is an image depicting the unedited, edited, and over-edited views of a statue nose using the Pixel Neighbor Repetitive Averaging function; and FIG. 13 is an edited point cloud of a dose-up of a statue nose with the Scatter Points Deletions, the Compression of Minimum and Maximum Pixel Neighbor Distance Value, and Pixel Neighbor Repetitive Averaging methods applied without altering the density of the original scan file image;

FIG. 14 illustrates the inventive method used with optimal error bars;

FIG. 15 illustrates the scan surfaced for the scan points used throughout the paper;

FIG. 16 illustrates a surface scanned at full resolution;

FIG. 17 illustrates an object that has been scanned at low resolution;

FIG. 18 illustrates a triangulated low resolution point cloud of a planar surface;

FIG. 19 illustrates a high resolution scan point cloud of a planar surface;

FIG. 20 illustrates a low resolution scan which measures the exact point distances and triangulated points;

FIG. 21 illustrates neighborhood pixel interpolations with the neighboring distances interpolated within predetermined noise margins;

FIG. 22 illustrates the error bar reset by the neighboring, distance and resolution corrected, distance if no neighboring point exceeds the error bar limits.

FIG. 23a is code for a CPointCloudApp::DeleteErr routine.

FIG. 23b is a continuation of the code for a CPointCloudApp::DeleteErr routine.

FIG. 23c is a continuation of the code for a CPointCloudApp::DeleteErr routine.

FIG. 24a is code for a CPointCloudApp::CompressMaxMin routine.

FIG. 24b is a continuation of the code for a CPointCloudApp::CompressMaxMin routine.

FIG. 24c is a continuation of the code for a CPointCloudApp::CompressMaxMin routine.

FIG. 24d is a continuation of the code for a CPointCloudApp::CompressMaxMin routine.

FIG. 24e is a continuation of the code for a CPointCloudApp::CompressMaxMin routine.

FIG. 24f is a continuation of the code for a CPointCloudApp::CompressMaxMin routine.

FIG. 25a is code for a CPointCloudApp::PixelNeighborAveraging routine.

FIG. 25b is a continuation of the code for a CPointCloudApp::PixelNeighborAveraging routine.

FIG. 25c is a continuation of the code for a CPointCloudApp::PixelNeighborAveraging routine.

FIG. 25d is a continuation of the code for a CPointCloudApp::PixelNeighborAveraging routine.

FIG. 25e is a continuation of the code for a CPointCloudApp::PixelNeighborAveraging routine.

FIG. 25f is a continuation of the code for a CPointCloudApp::PixelNeighborAveraging routine.

FIG. 25g is a continuation of the code for a CPointCloudApp::PixelNeighborAveraging routine.

FIG. 25h is a continuation of the code for a CPointCloudApp::PixelNeighborAveraging routine.

FIG. 25i is a continuation of the code for a CPointCloudApp::PixelNeighborAveraging routine.

FIG. 25j is a continuation of the code for a CPointCloudApp::PixelNeighborAveraging routine.

FIG. 25k is a continuation of the code for a CPointCloudApp::PixelNeighborAveraging routine.

FIG. 25l is a continuation of the code for a CPointCloudApp::PixelNeighborAveraging routine.

FIG. 25m is a continuation of the code for a CPointCloudApp::PixelNeighborAveraging routine.

FIG. 25n is a continuation of the code for a CPointCloudApp::PixelNeighborAveraging routine.

FIG. 25o is a continuation of the code for a CPointCloudApp::PixelNeighborAveraging routine.

FIG. 25p is a continuation of the code for a CPointCloudApp::PixelNeighborAveraging routine.

FIG. 25q is a continuation of the code for a CPointCloudApp::PixelNeighborAveraging routine.

FIG. 25r is a continuation of the code for a CPointCloudApp::PixelNeighborAveraging routine.

FIG. 25s is a continuation of the code for a CPointCloudApp::PixelNeighborAveraging routine.

FIG. 25t is a continuation of the code for a CPointCloudApp::PixelNeighborAveraging routine.

FIG. 25u is a continuation of the code for a CPointCloudApp::PixelNeighborAveraging routine.

FIG. 25v is a continuation of the code for a CPointCloudApp::PixelNeighborAveraging routine.

FIG. 25w is a continuation of the code for a CPointCloudApp::PixelNeighborAveraging routine.

FIG. 25x is a continuation of the code for a CPointCloudApp::PixelNeighborAveraging routine.

FIG. 25y is a continuation of the code for a CPointCloudApp::PixelNeighborAveraging routine.

FIG. 25z is a continuation of the code for a CPointCloudApp::PixelNeighborAveraging routine.

FIG. 26a is code for a CMainFrame::LocalLimits routine.

FIG. 26b is a continuation of the code for a CMainFrame::LocalLimits routine.

FIG. 27a is code for a CMainFrame::Converge routine.

FIG. 27b is a continuation of the code for a CMainFrame::Converge routine.

FIG. 27c is a continuation of the code for a CMainFrame::Converge routine.

FIG. 27d is a continuation of the code for a CMainFrame::Converge routine.

FIG. 27e is a continuation of the code for a CMainFrame::Converge routine.

FIG. 27f is a continuation of the code for a CMainFrame::Converge routine.

FIG. 27g is a continuation of the code for a CMainFrame::Converge routine.

FIG. 27h is a continuation of the code for a CMainFrame::Converge routine.

FIG. 27i is a continuation of the code for a CMainFrame::Converge routine.

FIG. 27j is a continuation of the code for a CMainFrame::Converge routine.

FIG. 27k is a continuation of the code for a CMainFrame::Converge routine.

FIG. 27l is a continuation of the code for a CMainFrame::Converge routine.

FIG. 27m is a continuation of the code for a CMainFrame::Converge routine.

FIG. 27n is a continuation of the code for a CMainFrame::Converge routine.

FIG. 28a is code for a CMainFrame::DeleteScatterError routine.

FIG. 28b is a continuation of the code for a CMainFrame::DeleteScatterError routine.

FIG. 28c is a continuation of the code for a CMainFrame::DeleteScatterError routine.

FIG. 28d is a continuation of the code for a CMainFrame::DeleteScatterError routine.

DETAILED DESCRIPTION OF THE PREFERRED EMBODIMENTS

Figure 1:
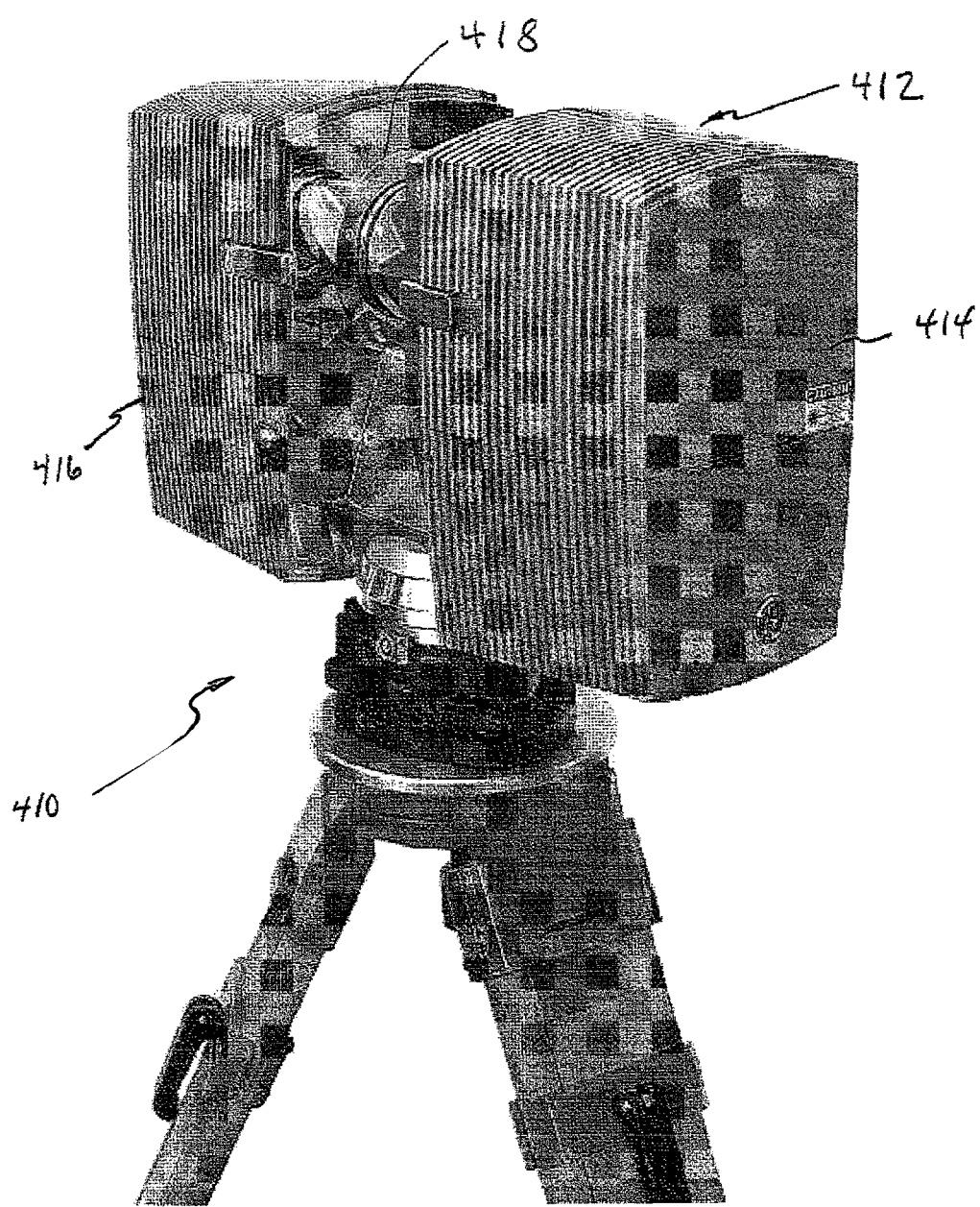
FIG. 1 is an image of the 3D spatial laser scanner.

Referring to FIG. 1, an image of a typical 3D spatial laser scanner 410 with a rotating head 414 comprised of two rectangular blocks 412 and 416 between which a wedged mirror 418 rotates is shown. The scanner aims a laser beam in a systematic mode of operation by the rotation of the head of the scanner in increments between two pan angle limits. The width of the scan field of view is obtained by the rotation of the head while the height of the scan field is obtained by a mirror that flips vertically. The distance value measurement is recorded as the distance between the origin of the laser and the surface of the first object within its path.

The systematic emission of millions of laser beams allows the 3D laser scanner to collate accurate measurement of distances to objects producing a 3D model often referred to as a "Point Cloud." A typical point cloud contains "noise" which constitutes scatter points and surface roughness. Scatter points, usually observed when the angle of incidence increases or decreases nearing the parallel values of the laser beam direction. Therefore, the presence of scatter points is at a minimum when the laser beam bounces off surfaces perpendicular to the laser beam direction. When a buildup of high noise data occurs, scatter points can exhibit new surfaces when this data fills out gaps between objects offset in 3D space.

Figure 2:
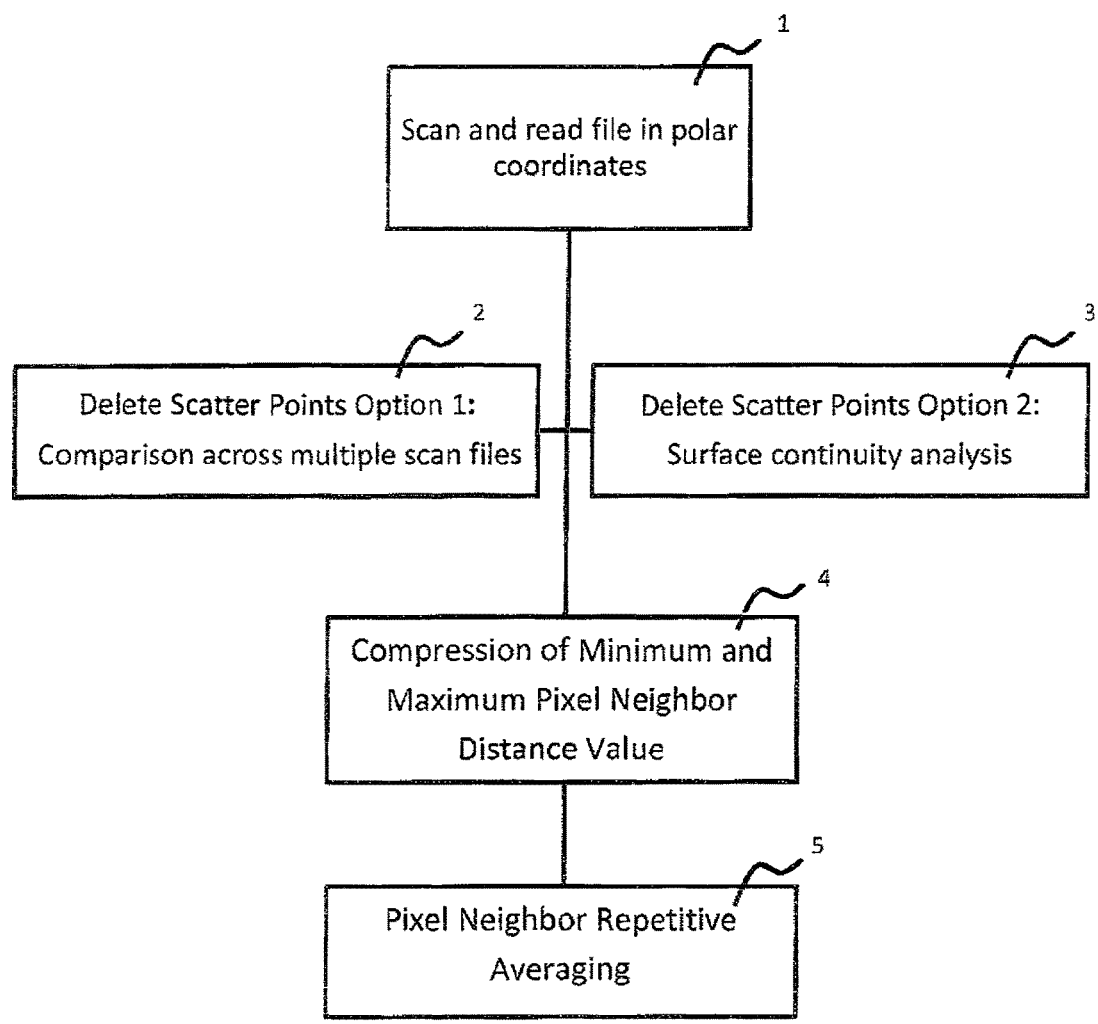
FIG. 2 is a flow chart of the Overall Noise Free and Smooth 3D Point Cloud Surface method.

Referring to FIG. 2, a flow chart depicting the overall scheme of the Noise Free, Smooth 3D Point Cloud Surface methodology is shown. For optimum results in many cases, methods 2-5 should be employed sequentially to delete scatter points and to produce an image with a smooth surface. In other instances, steps 2, 3, 4, and 5 can be utilized sequentially or non-sequentially and do not all have to be utilized based on the objective of the user.

Figure 9:
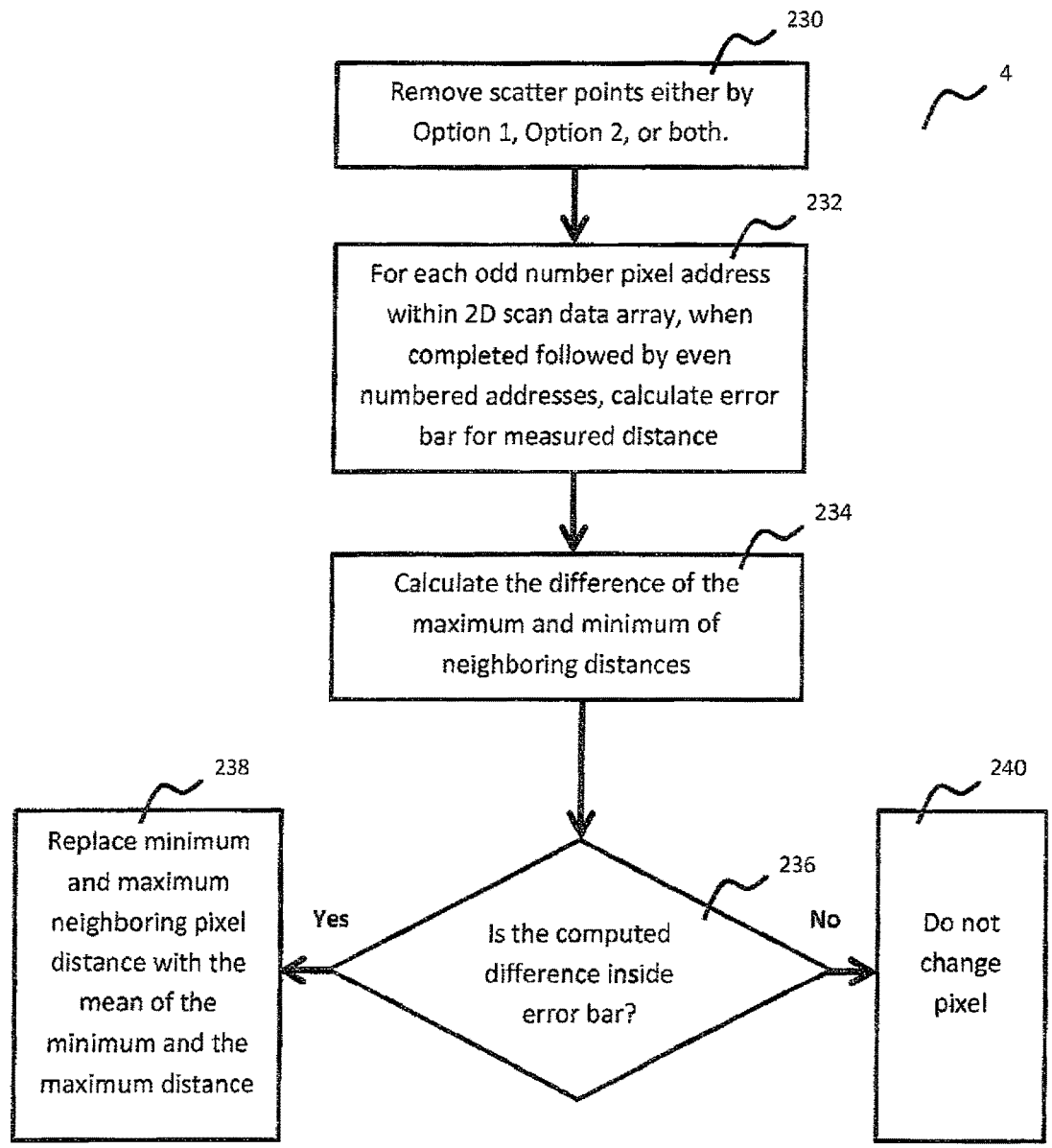
FIG. 9 is a flow chart depicting in detail the Compression of Minimum and Maximum Pixel Distance Value method.

At step 1, an object is scanned using a laser scanner or obtained as a file and read in polar coordinates. In step 2, Delete Scatter Points Optional: Comparison across multiple scan files is employed. A detailed description of step 2 is explained in FIG. 5. In step 3, Delete Scatter Points Option 2: Surface continuity analysis is performed. A detailed description of step 3 is provided in FIG. 6. In step 4, the Compression of Minimum and Maximum Pixel Neighbor Distance Value function is performed. FIG. 9 provides a detailed description of method 4. In method 5, Pixel Neighbor Repetitive Averaging function is performed. A detailed description of method 5 is provided in FIG. 10.

Figure 3:
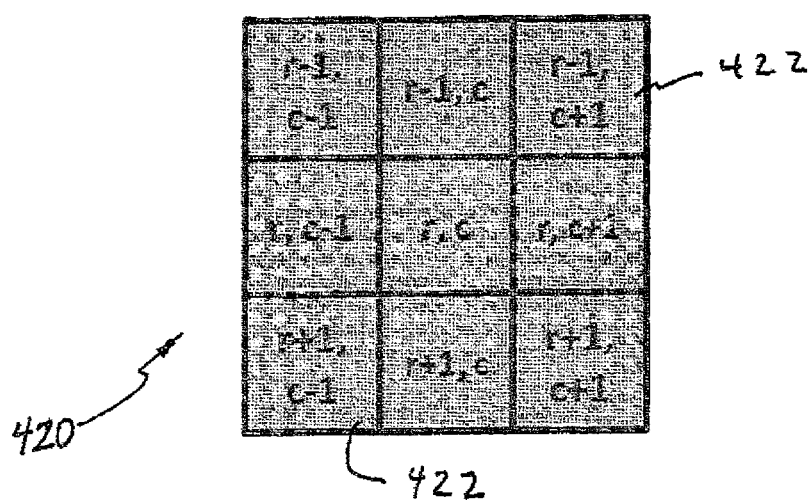
FIG. 3 is an image depicting the pixel labeling convention for a 2D array which contains 3D point cloud data.

Referring to FIG. 3 an image is shown depicting the pixel labeling convention 420 for a 2D array which contains 3D point cloud data in the program. This convention utilizes row and column indices 422 to label a pixel giving it an address specific to one specific pixel in a scan file. This address allows for identification of the pixel within the scan file and comparison of pixels at the same address in multiple scan files.

Figure 4:
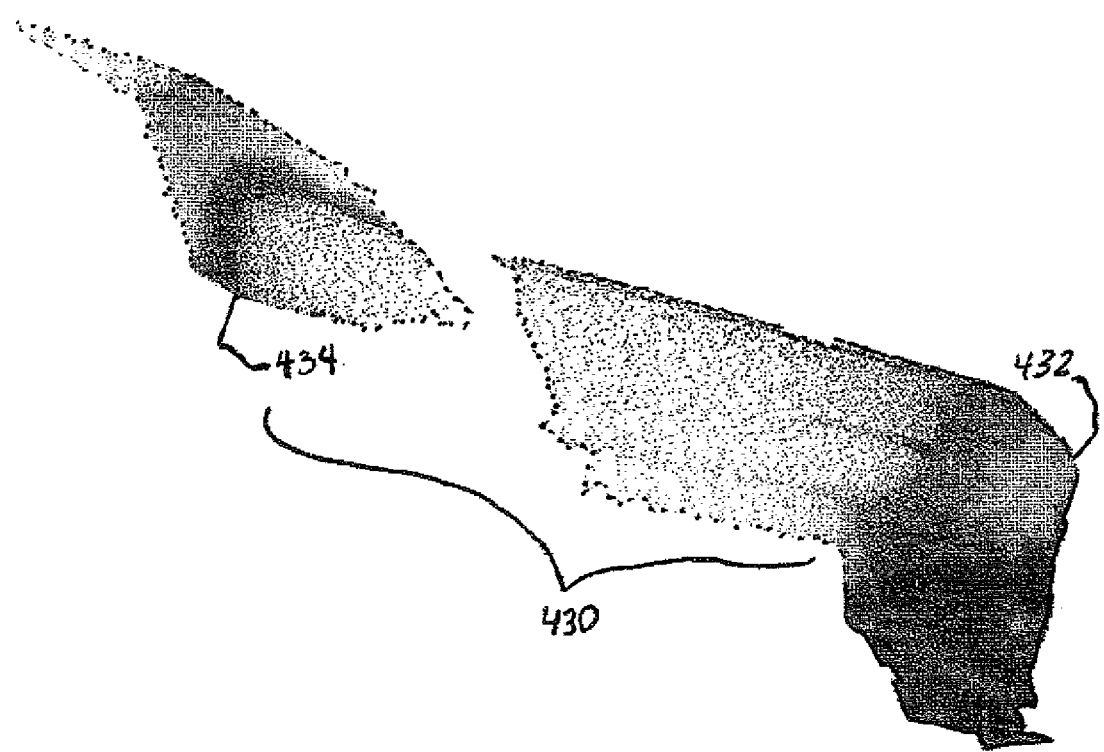
FIG. 4 is an unedited point cloud of a statue head in original scan file form.

Referring to FIG. 4, an unedited point cloud of a statue head 432 is shown in original scan file form. A substantial amount of scatter points 430 are visible between the head 432 of the statue and the wall 434 behind it. As with other physical measurement systems, all data collected is subject to statistical noise. This amount of noise observed as scatter points is typical of 3D laser scans resulting in unclear edge between the statue and the background of the image.

Figure 5:
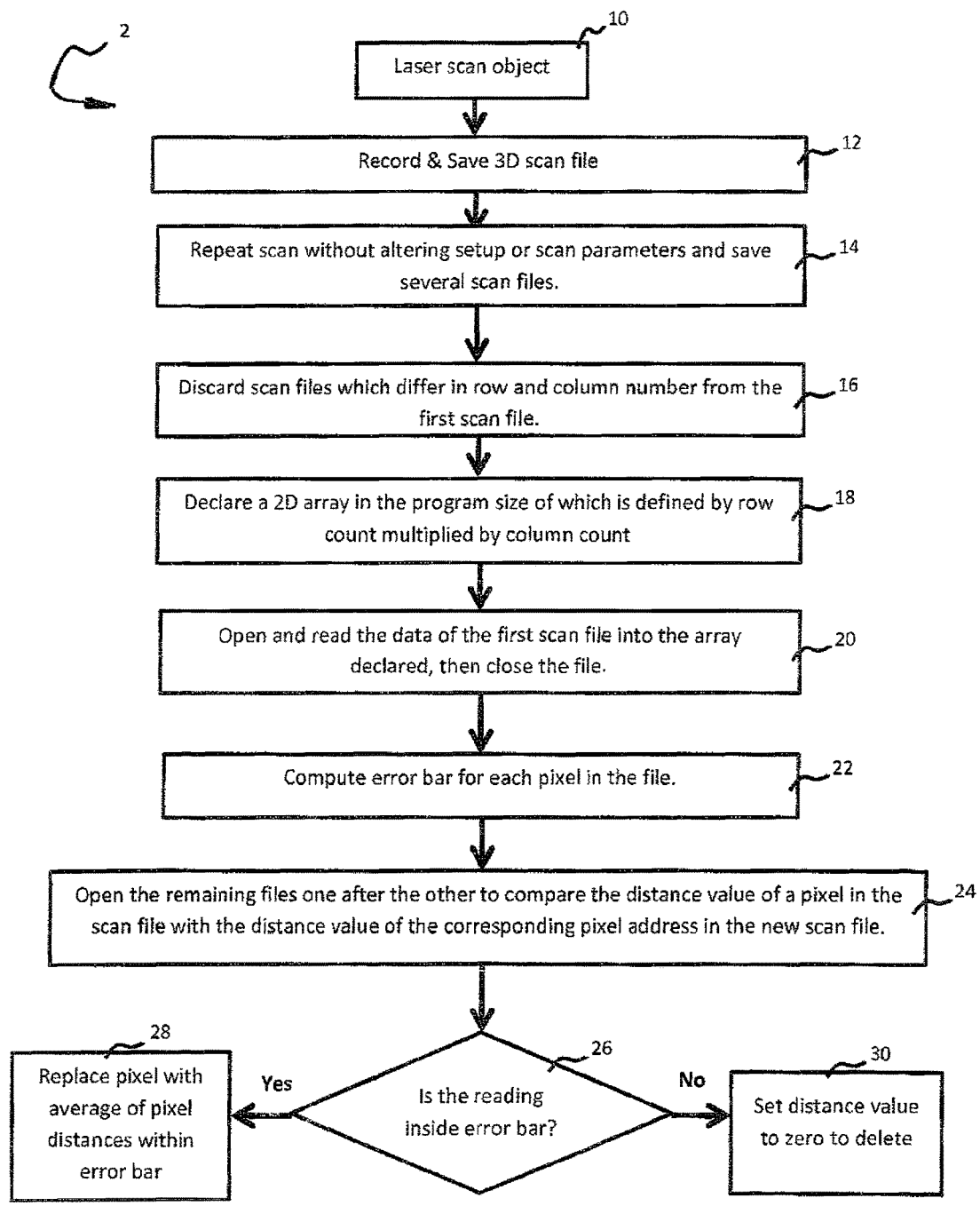
FIG. 5 is a flow chart depicting the method of the Delete Scatter Points Option 1: Comparison of distance values across multiple scan files.

Referring to FIG. 5, a flow chart is shown explaining step 2 Delete Scatter Points Option 1: Comparison across multiple scan files. Step 2 deletion of scatter points should be utilized if many scan files are available because the comparison of many scan files creates more certainty as to which points are scatter points and which are not through the fluctuation of distance value measured across multiple scan files. An object is scanned by a 3D laser scanner at step 10. If the file is not already read in polar coordinates, the file must be converted to polar coordinates. The file containing polar coordinates is then recorded and saved as a 3D scan file at step 12. At step 14, the 3D scan is performed multiple times without altering the scan arrangement or scan parameters and these files are saved if the row and column number is equal to the row and column number from the scan file obtained in step 10. If the row and column number differs, at step 16 the scan should be discarded. Ideally 8 or more scan files of the same size should be obtained for accurate comparison.

Once an adequate number of scan files have been obtained, at step 18, a 2D array is declared in the program, size of which is defined by row count multiplied by column count. At step 20, the data from the first scan file obtained in steps 10 and 12 is read into the array declared and the file is dosed. The error bar is computed at step 22 for each pixel within the file.

The error bars or uncertainly in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function." Error functions, at its simplest, can be a percentage of the measured distance, a linear function, piecewise linear or be more complex function. Error function must be conservative and return maximum noise margin for the distance and surface color input. The resultant error function is then hard coded in the software.

At step 24, the remaining files are opened one after the other and the distance value of each pixel is read to determine whether the difference between the pixel distance value and the new file corresponding pixel address distance lies within the estimated error bar at step 26. At step 28, replace the distance value with the average of those pixel distance values that lie within the error bar. If the difference between the pixel value distance reading and the new file distance value is outside of the error bar, the distance value of the pixel should be deleted by setting the value equal to zero.

Figure 6:
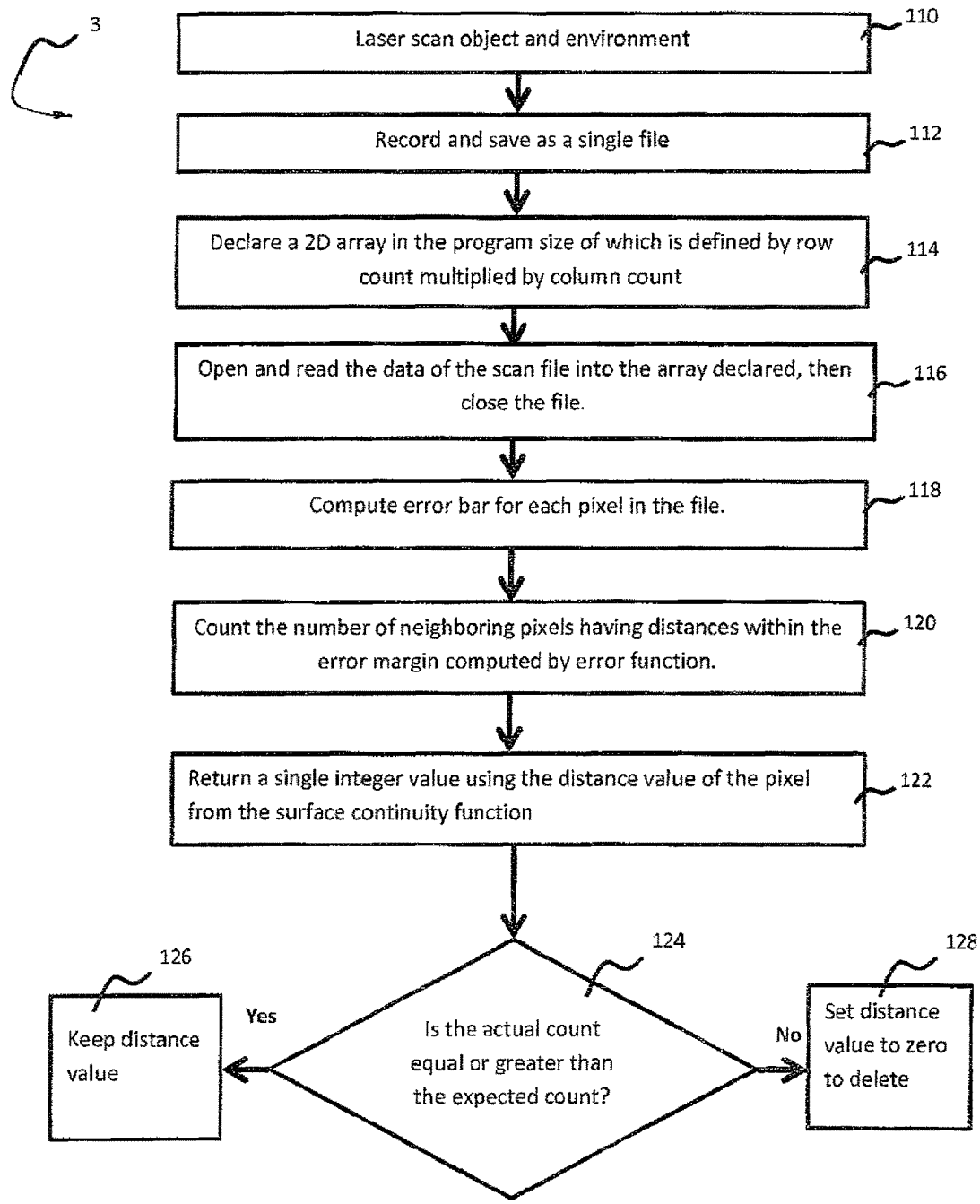
FIG. 6 is a flow chart depicting the method Delete Scatter Points Option 2: Surface continuity analysis.

FIG. 6 is a flow chart depicting the method Delete Scatter Points Option 2: Surface continuity analysis. Surface continuity analysis is used in order to distinguish scatter points from points that make up actual scanned body or surface and this is determined by the count that must be satisfied of neighboring pixel distances for which their distance values lies within the error bar of the center pixel for the point to not be considered a scatter point.

The surface continuity function, which returns this integer threshold i.e. between 1 and 8 (minimum and maximum count of neighboring pixels), must be found through experimentation and hard coded in software. The surface continuity function output which is utilized in step 3 is determined from the distance values and surface color stored in the 2D array. Step 3 deletion of scatter points does not require additional sets of scan data to be compared.

At step 110, an object and the environment is scanned by a 3D laser scanner. If the file is not already read in polar coordinates, the file must be converted to polar coordinates, the file containing polar coordinates is then recorded and saved as a 3D scan file at step 112. At step 114, a 2D array is declared in the program, size of which is defined by row count multiplied by column count. At step 116, the data from the first scan file obtained in steps 110 and 112 is read into the array declared and the file is dosed. The error bar is computed at step 118 for each pixel within the file. The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function". Surface continuity function and error function are complementary functions. For example, for a large distance between the scanner and the object scanned, larger errors can be expected; however, if a large enough error bar has not been determined by the error function, then surface continuity function can offset by lowering the threshold for the number of neighboring distances expected to be within the error bar of the center pixel.

At step 120 count the number of neighboring points having distances within the error margin computed by error function 118. At step 122 return a single integer value for the surface continuity threshold number using the distance and color value of the pixel from the surface continuity function. At step 124 determine if the actual count of the pixels from 122 is greater than or equal to the expected count. If the actual number is greater than or equal to the expected count, the distance value remains unchanged in step 126. At step 128, if the actual count of the pixels is less than the expected count, the pixel distance value is deleted by setting the value to zero.

Figure 7:
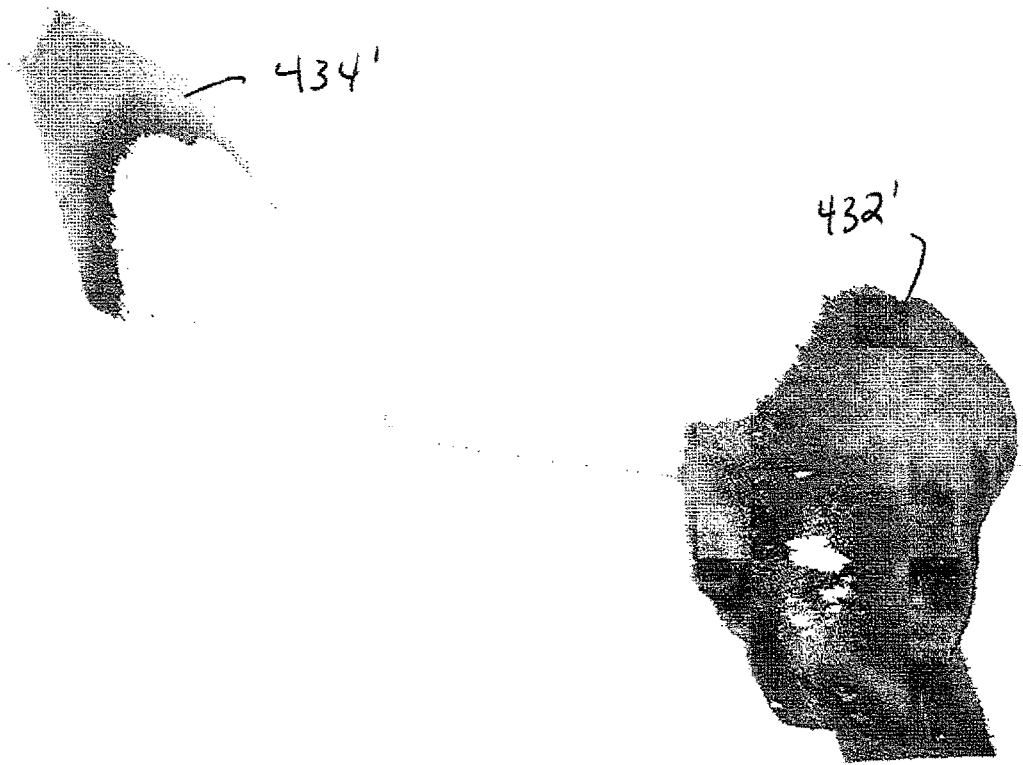
FIG. 7 is an edited point cloud of a statue with Delete Scatter Points Options 1 or 2 applied.

Referring to FIG. 7, an edited point cloud of a statue head 432' is shown after scatter points have been deleted in steps 2 and steps 3. When viewed in comparison to FIG. 4, the significant deletion of scatter points can be viewed in the center of the image between the statue head 432' and the wall 434' as the true surface of the figure has been determined and the scatter points deleted.

Figure 8:
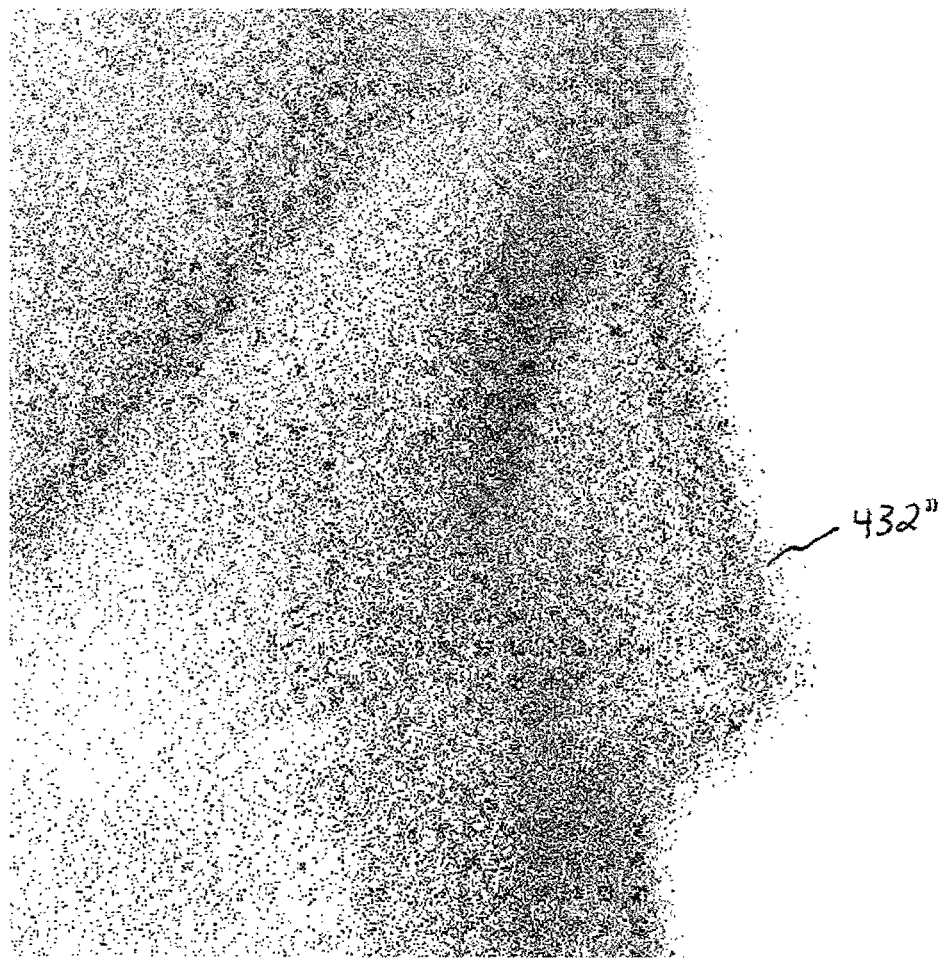
FIG. 8 is and unedited close-up view of a statue nose in original scan file form.

Referring to FIG. 8, an unedited point cloud of a dose-up view of a statue nose 432" in original scan file form is shown. The amount of surface roughness observed is typical of 3D laser scans. The amount of surface roughness visible causes a blurred image, inhibits precise measurements from being taken, and in-depth analyses from being executed to a high degree of certainty because of the high error involved. For example, small degrees of change over time of a surface being measured cannot be observed or quantified to a high degree of certainty with a large amount of statistical surface noise present which prevents the capabilities of the 3D laser scanner from being utilized to its fullest extent.

Referring to FIG. 9, a flow chart is shown depicting in detail step 4 Compression of Minimum and Maximum Pixel Neighbor Distance Value. At step 230, the software determines whether the scatter points have been deleted by step 2 Option 1, step 3 Option 2, or both steps prior to moving forward with step 4. At step 232, for each odd number pixel address within the 2D scan data array; calculate the error bar for the measured distance value. Once the odd number pixel address error bar has been determined, complete the same for the even numbered addresses. The error bar is computed at step 232 for each pixel within the file. The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function". At step 234, the maximum and minimum neighboring pixel distance values are determined, excluding array border points, and the difference is found between the two values. Whether the difference between the minimum and maximum values from step 234 is within error bars 232 is determined in step 236. If value 234 is within error bar 232, replace the minimum and maximum neighboring pixel distance with the mean of the minimum and maximum distance value in step 238. If value 234 is outside of error bar 232, the pixel is not altered.

Figure 10:
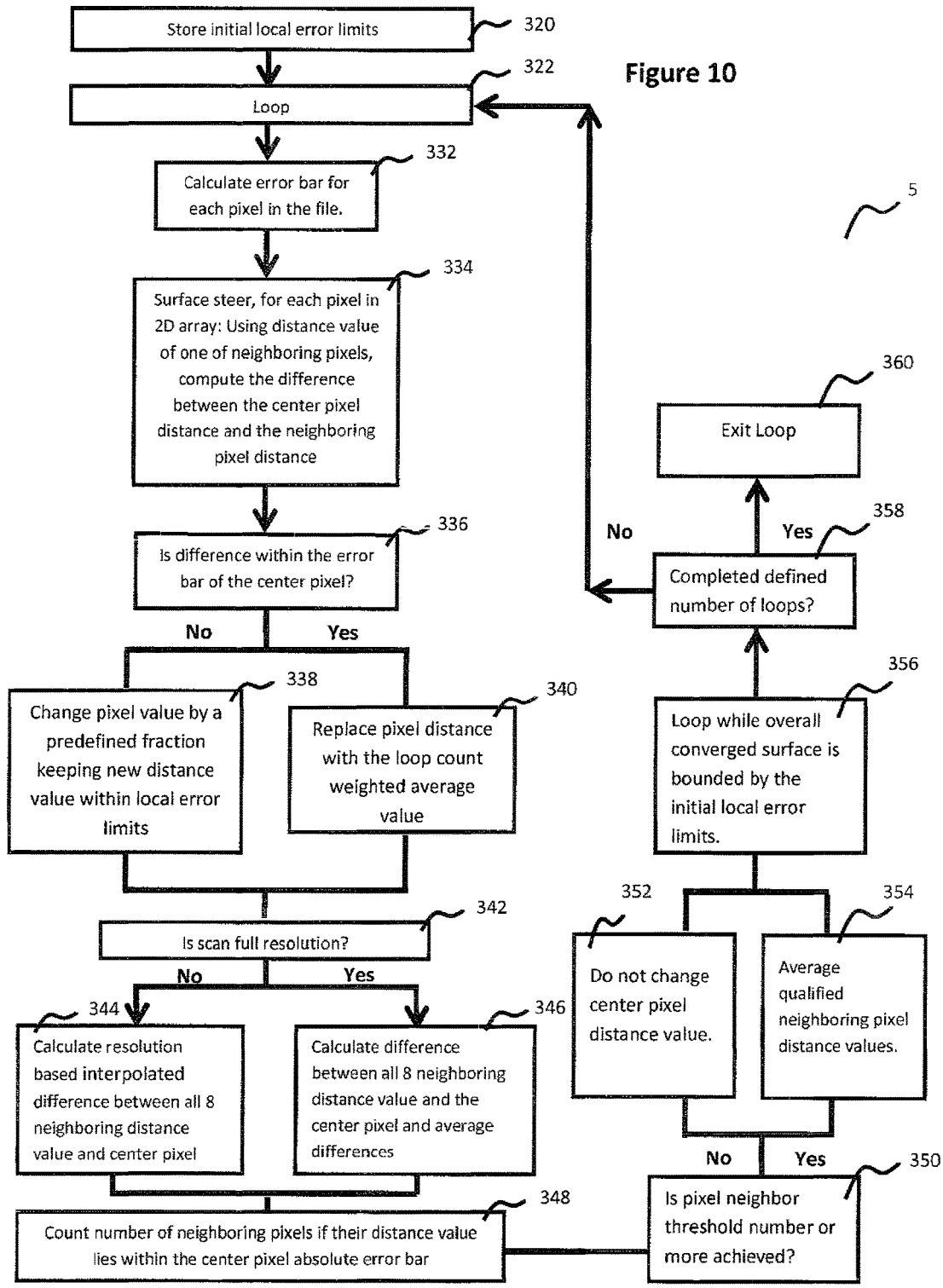
FIG. 10 is a flow chart depicting in detail the Pixel Neighbor Repetitive Averaging method.

Referring to FIG. 10, a flow chart is shown depicting in detail step 5, the inventive Pixel Neighbor Repetitive Averaging method, which may be implemented on a computer, such as a personal computer of usual design. Such personal computer is programmed with software for receiving point cloud data and performing the point cloud data processing steps described hereinabove and herein below, with the output processed point cloud data sent for example, to a monitor for display, a file for storage or a printer. This method achieves the noise free/smooth point cloud surface feel and can be used to process a point cloud data set with or without scatter points removed. However, using a point cloud data set with scatter points deleted (for example by either the Option 1 or Option 2 delete scatter point methods) achieves superior results. Pixel Neighbor Repetitive Averaging is so named herein because the technique is an iterative process of averaging certain number of neighboring pixel distance values and replacing the new averaged distance value with the center pixel distance value for each scan points in a 2D point cloud array. As the iterations; or loop count increases the noisy point cloud tends to a noise free state. Pixel Neighbor Repetitive Averaging Method queries the tendency of forming noise free point cloud surface between each loop and steers the smoothening surface, making sure it is always bounded by the initial noisy point cloud local minimum and maximum error limits. Steps 332, 334, 336, 338 and 340 refer to "surface steer" technique, and steps 342, 344, 346, 348, 350, 352 and 354 refer to "averaging of neighbour pixel distance values" technique of Pixel Neighbor Repetitive Averaging.

In step 320, local error limits are calculated, either in the raw scan file state or with scatter points deleted and "Compression of Minimum and Maximum Pixel Neighbor Distance Value" function applied and stored for each pixel. Having this information informs the software optimum smoothing achieved and steer required during the formation of smooth point cloud surface. Local error limits are maximum and minimum noise observed in either immediate neighbouring points (8 points) or second order neighbouring points (8 neighboring points+16 points adjacent the neighboring points) or may be higher order neighbouring points.

Step 322 is beginning point of each loop.

In step 332 the error bars or uncertainty in measured distance is returned from an error function for each point. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function".

In step 334, for each pixel in the point cloud array, use the distance from one of the neighboring pixels in sequence and compute the difference between the center pixel distance and neighboring pixel. For each loop, neighbour pixels can be used in sequence. Alternatively, a test criterion can be adapted in choosing most suitable neighboring pixel distance, such as finding the neighboring pixel whose distance value is closest to the midpoint of local error limits of Step 320.

At step 336, one determines if the difference is within error bar calculated at step 332. If the answer to step 336 is "no" then at step 338, one changes the distance value for the pixel by a predefined fraction whilst keeping the new distance value within the range defined by the original distance value for the pixel plus or minus the error bar. At step 338, the pixel distance value can be changed by adding or subtracting a small fraction of the pixel distance value to itself. For example, if the measured distance value is X meters then the distance value can be changed by a small fraction, say 0.001% {or X (+/−) (X*0.00001)}. The addition or subtraction of a small fraction of the pixel distance value to itself depends on the behaviour or the formation of the smooth surface between each loop, such that smooth surface position always remain within the local error limits of step 320.

If the answer to step 336 is yes, one replaces the pixel distance with the loop count weighted average value at step 340. The weighted average may be determined by the following formula: new distance value= ((Current_distance_value*loop_count)+Changed_distance_value)/(loop_count+1). The steering of the smoothening surface with the weighted values of step 340 emphasizes the developing surface trajectory.

At step 342, one determines the scan resolution which is set as a main scan parameter prior to the collection of the scan. The frame size of all scans is the same if the field of view parameter remains the same; however, the density of the point cloud within the frame size varies based on resolution. If a high resolution scan is recorded, one can more freely average the points because the points are closer together and will be moved by smaller increments. If the scan is of a lower resolution, the points are further apart and one cannot be as sure whether the points are noise or part of the intended image. The points are further apart in a low resolution scanner because the scanner has moved a larger angle or distance before firing the next laser beam. Scanners typically have eight to ten resolution settings such as Full 1, Half ½, Quarter ¼, and so on. Because averaging can have different effects based on scan resolution, the inventive method ideally factors in the resolution when an average is found between neighboring points so as not to over or under smooth the image.

If the scan is not scanned at highest resolution, at step 344, calculate the resolution based interpolated distance differences between the center pixel distance value and the distance values of its eight neighboring pixels, such as by a linear, cubic spline or similar function. For example, if the scan resolution is half and the difference between the center pixel distance and one of its neighboring pixel distances X millimeters, then by linear interpolation, the difference can be taken as X/2 millimeters. If the scan is full resolution, at step 346, calculate the difference between all eight neighboring distance values and the center pixel and determine the average of the differences.

At step 348, count the number of neighboring pixels if their distance value lies within the error bar, which is calculated by the error function, of the center pixel.

At step 350, the actual count of step 348 is checked against a threshold "count".

The "count" is returned from Pixel Neighbor Count Function, Pixel Neighbor Count Function is a function of distance, object surface color, scan resolution and laser beam angle of incidence and evaluated by experimentation and then hard coded in the software. Typically, threshold count (threshold integer value of Pixel Neighbor Count Function) returned is between 4 and 8.

At step 352, if the actual count of step 348 is less than the threshold integer value of Pixel Neighbor Count Function then the centre pixel distance value remains unchanged. On the other hand, if the actual count is greater than the threshold count returned by the Pixel Neighbor Count Function, at step 354 the software averages the counted distance values (those values within the range defined by the original distance value for the pixel plus or minus the error bar) of step 348 and update the centre pixel distance value with the new average value. Hence, Pixel Neighbour Averaging moves the centre pixel distance value by a small incremental distance towards an equilibrium state, or the smooth surface state. In the inventive Pixel Neighbor Repetitive Averaging technique, no points are deleted.

Careful evaluation of the Pixel Neighbor Count Function is important If unusually low threshold count is returned by the Pixel Neighbor Count Function then pixels are encouraged to move more frequently. This may in turn have an adverse effect in the formation of a smooth surface such as a ripple effect on the smooth surface between the localized maximum and minimum error limits of step 320 as viewed in the double line of FIG. 12. It is observed being selective and moving fewer points (high threshold count returned by the Pixel Neighbor Count Function) in each loop and using higher number of loop count (overall scan point's movement) yield best results. In simple applications Pixel Neighbor Count Function can be constant.

By step 356, the two functionalities of Pixel Neighbor Repetitive Averaging, i.e. Surface Steer and Pixel Neighbor Averaging are completed for each loop. At step 356, loop count is left open ended, and looping continues provided the trajectory of the smooth surface taking shape remains within the local error limits determined at step 320. If the forming smooth surface trajectory crosses the local error limits, then loop exit flag is raised and the final value for the distance for that pixel has been determined by the system software.

Alternatively, at step 358, the number of loops required may be predetermined and hard coded in the software. Still another possibility is to define a maximum number of loops from the scan resolution.

If the defined number of loops has not been completed (whether it is a predetermined fixed number or defined as detailed above), the software begins the loop again at step 322. If the defined number of loops has been completed, exit loop at 360. Looping can be forced to abandon in step 358 if exit flag is raised in step 356.

Loop count is also important in this software so that the surface is not under smoothened. Higher resolution scans typically utilize higher loop counts because noise levels can be higher.

As a guide for step 358, fixed number of loop count, half resolution scans, which are obtained be twice the pan and tilt angle increment of the scanner head, typically would need half the loop count required by full resolution scan to smooth the surface.

Figure 11:
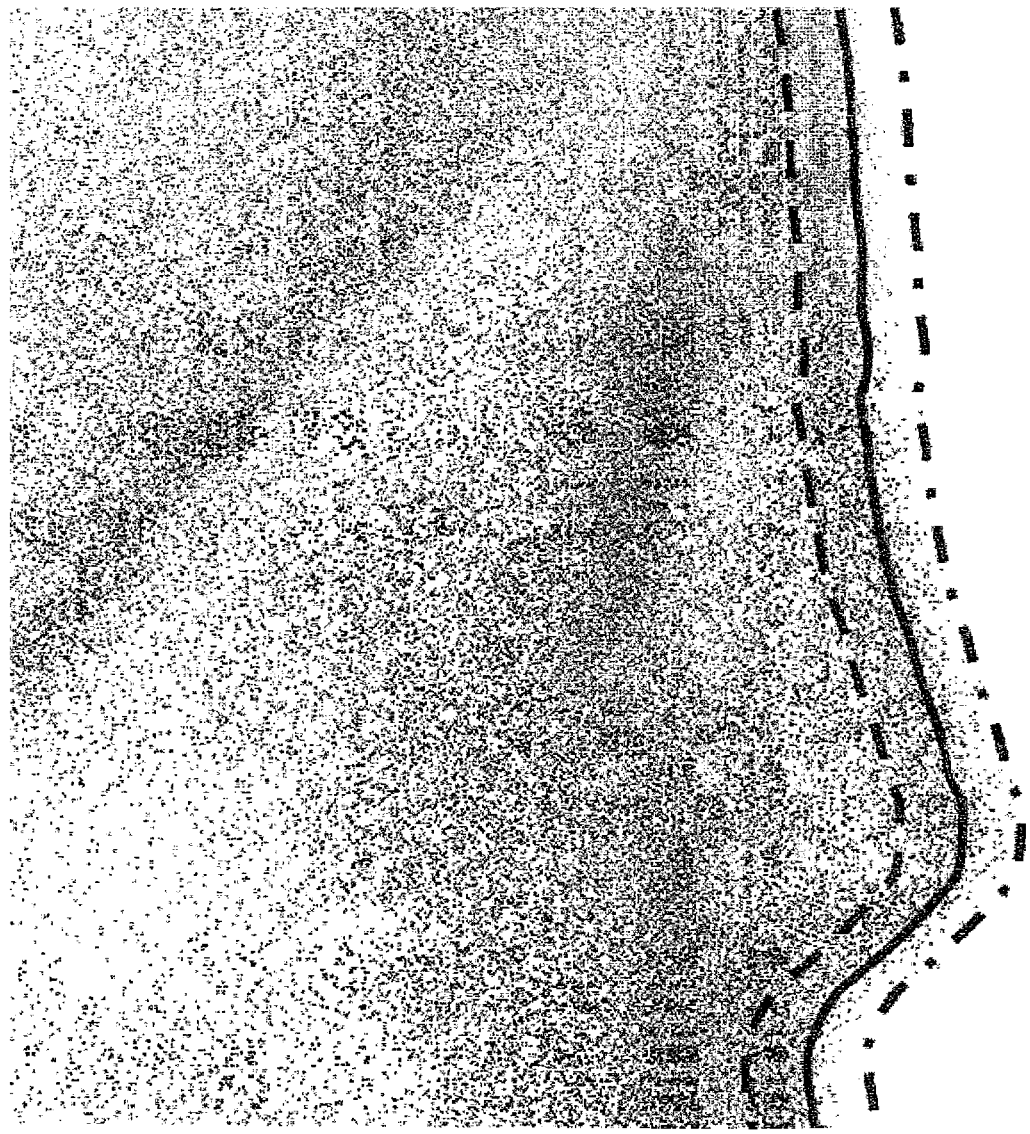
FIG. 11 is an image depicting the maximum and minimum limits of the Pixel Neighbor Repetitive Averaging method imposed on a statue nose.

Referring to FIG. 11, an image is shown of a statue nose illustrating the Pixel Neighbor Repetitive Averaging method with a correct loop count and correct surface steer. The noise smoothing minimum error bar limit is represented by the dash-dot-dash line. The noise smoothing maximum error bar limit is represented by the dashed line. These maximum and minimum error limits are equal to the error bars determined and stored from the error function prior to the software employing the smoothing method. The error bars or uncertainty in measured distance is returned from an error function. Error function is determined through experimenting in a conventional fashion, in this case collating the error widths observed for objects at known distance intervals, having various surface RGB values and facing the scanner at various angles in order to vary the angle of incidence of the laser beam. Once the experimentation is conducted, the equation fitting techniques, together with changing confidence levels in data, is used to interpolate through the collected data and arrive at the function that best represent the noise in scanner hardware data output, or conveniently named as an "error function". For a fixed optimal loop count or for open ended loop count where noisy surface is allowed to form by correct steering within the local error margins the solid line noise free surface trajectory is achieved using the Pixel Neighbor Repetitive Averaging method.

Referring to FIG. 12, an image is shown of a statue nose illustrating the Pixel Neighbor Repetitive Averaging method with an incorrect loop count or in correct surface steer. The noise smoothing minimum error bar limit is represented by the dash-dot-dash line. The noise smoothing maximum error bar limit is represented by the dashed line. The solid line represents the over smoothed surface if an adequate loop count is not determined and the software is allowed to run without using these error bar limits. The double line shows a ripple effect if a low count threshold number is returned by the Pixel Neighbor Count Function.

Referring to FIG. 13, an edited point cloud of a dose-up of a statue nose with the Scatter Points Deletion steps 2 and 3, the Compression of Minimum and Maximum Pixel Neighbor Distance Value step 4, and Pixel Neighbor Repetitive Averaging step 5 applied.

Code for implementing the inventive method can be found in FIGS. 23*a* to 23*c* implementing a DeleteErr routine, FIGS. 24*a* to 24*f* implementing a CompressMaxMin routine, and FIGS. 25*a* to 25*d* implementing a PixelNeighborAveraging routine. These three primary functions are the three main operations described above.

Another embodiment of the invention provides correlation between a laser scanner resolution and scan data noise, which allows for reverse engineering of observed objects with complex surface details obtained from point source 3D laser scanner.

Resolution is defined as the set number, X, that divides the field of view of the scanner (elevation or pan) and in time predetermines the maximum point cloud density achievable for a particular 3D point source laser scanner. When the scanner increments through the angular steps of (360°/X) and emits a laser beam (measuring the distance of the first object encountered) then the data collected is said to be at the maximum scanner resolution. If scanner head rotates at 2×(360°/X) the angular steps, then the scan resolution will be half. Similarly, if the scanner rotates at 4×(3600/X) the angular increments then the scan resolution will be a quarter and so on.

Scanner resolution has an important effect on noise. For example, consider a planar surface at a fixed distance away from the scanner under two scenarios: 1) surface scanned at full resolution 2) object scanned at lower resolution, FIGS. 16 and 17 respectively. The lines depict the transient laser beam from the scanner. The dots represent the measured distance, as shown, erroneous and randomly distributed about the actual surface.

When displayed on a computer screen, noise from a high resolution scan is always more prominent as the fluctuations of neighboring distance readings have higher concentration per unit area. A triangulated (i.e. surfaced, for example FIG. 15 is surfaced for the scan points used throughout the paper) low resolution point cloud for the planar surface therefore may appear as a better representation of the planar surface, FIG. 18 compared to FIG. 19. To resolve this problem, post treatment techniques of reducing high resolution point clouds exist; usually by permanently deleting alternating points; in effect halving the scan file size (e.g. FARO Noise Compression—when originally defined). Such operations are computationally inexpensive but have significant drawbacks.

As mentioned, for high resolution scans, or for objects standing close to the scanner, visibility of noise is more apparent; however, at the same time, it is feasible to work out the object surface more accurately under continuity. In contrast, as the distance between neighboring points becomes large, either due to low resolution or objects further away from the scanner, noise will be concealed but surface continuity becomes uncertain as points become more isolated. Scanning at low resolution is not desirable as each point cloud lattice represents a larger unit area of the object surface, and as a result, many surface details/complexity will be missed. For instance, the low resolution scan of FIG. 20 measures the exact point distances as FIG. 17 and triangulated points from each example produce the same surface i.e. FIG. 19 albeit the actual surfaces differ in each scan. Understanding this phenomenon is important, especially when factoring the neighborhood pixel averaging, which is an essential element of noise compression. When performing neighborhood pixel interpolations, the neighboring distances should be interpolated to, at least, within predetermined noise margins, as shown in FIG. 21 according to distance and resolution of the points, whether the initial distance readings fall within the error limit or not.

For the multiple scan noise compression operation, the error bars can be set by observing change in pixel reading amongst the scans and setting the lower and upper error limits with a certain confidence level. However, with single scan noise compression, the freedom to analyze error behavior is unavailable and the error bar is set to data that already contains error. By referring to FIG. 22, if no neighboring point exceeds the error bar limits then the error bar may be reset by the neighboring distance, distance & resolution corrected (horizontal dotted lined, FIG. 22).

Correctly determining and operating within the error bar is important. In general, the narrower error bars will produce scan surfaces more representative of the actual scan surface. Larger error bars are ineffective because it provides more leeway for the smooth surface to form, which most often represent the actual object with less success. Too narrow error bars will impede the neighboring pixel averaging operation completely. In FIG. 14, the error bars are kept at optimum and the surface roughness of the concrete garden statue is visible as well as the overall scan being more representative of the actual object. On the other hand, whilst the FIG. 13 achieves the noise free look, it compromises the real surface features.

FIGS. 26*a* and 26*b* is code for setting new error bars on points (LocalLimits), FIGS. 27*a* to 27*n* is code for Pixel Neighbor Averaging (Converge), and FIGS. 28a to 28d is code for deletion of scatter points (DeleteScatterError).

While illustrative embodiments of the invention have been described, it is noted that various modifications will be apparent to those of ordinary skill in the art in view of the above description and drawings. Such modifications are within the scope of the invention which is limited and defined only by the following claims.

What is claimed is:

1. A system for generating a processed point cloud data set comprising:
   a scanner operably configured to scan a surface of an object or a portion thereof with a light source so as to generate a first point cloud data set, the first point cloud data set representing a noisy 3D model of the object and including first distance values corresponding to points on the surface of the object; and
   a processor operably configured to execute instructions for:
   receiving the first point cloud data set;
   generating second distance values from the first point cloud data set, at least one of the second distance values based on at least two neighboring points;
   generating a second point cloud data set based on the second distance values which are an average based distance value of the at least two neighboring points;
   performing one or more iterations to generate distance values so as to generate the second point cloud data set representing a noise free and smoothed representation of the noisy 3D model of the scanned object, each of the iteratively generated distance values being the average based distance value of at least two neighboring points of each of the distance values of the previous iteration; and outputting the processed point cloud data set to any one of a monitor for display, or a file for storage, or a printer.

2. The system in accordance with claim 1, wherein:
   generating second distance values from the first point cloud data set, at least one of the second distance values is an average distance value or a weighted average distance value of the at least two neighboring points.

3. The system in accordance with claim 1, wherein the processor is further operably configured to execute instructions for:
   calculating an error function for each of the first distance values in the first point cloud data set; and
   generating the second distance values based on the error function.

4. The system in accordance with claim 1, wherein:
   the processor is further operably configured to execute instructions for:
   calculating an error bar;
   calculating a difference between the second distance values and the error bar;
   determining whether the difference is within the error bar; and
   only if the difference is within the error bar, generate the second distance values.

5. The system in accordance with claim 1, wherein the processor is further operably configured to execute instructions for:
   generating the second distance values based on a change by adding or subtracting a predefined fraction.

6. A method for generating a processed point cloud data set comprising:
   scanning, with a scanner, an object to generate a first point cloud data set; the first point cloud data set representing a noisy 3D model of the scanned object and including first distance values corresponding to points on the surface of the object; and
   receiving, by a processor, the first point cloud data set;
   generating, by the processor, second distance values from the first point cloud data set, at least one of the second distance values based on at least two neighboring points;
   generating, by the processor, second point cloud data set based on the second distance values which are an average based distance value of the at least two neighboring points;
   performing, by the processor; one or more iterations to generate distance values so as to generate the second point cloud data set representing a noise free and smoothed representation of the noisy 3D model of the scanned object; each of the iteratively generated distance values being the average based distance value of at least two neighboring points of each of the distance values of the previous iteration; and
   outputting, by the processor, the processed point cloud data set to any one of a monitor for display, or a file for storage, or a printer.

7. The method in accordance with claim 6, wherein:
   generating, by the processor, second distance values from the first point cloud data set, at least one of the second distance values is an average distance value or a weighted average distance value of the at least two neighboring points.

8. The method in accordance with claim 6, wherein generating, by the processor, for each of the first distance values in the first point cloud data set:
   calculating, by the processor, an error function for each of the first distance values in the first point cloud data set; and
   generating, by the processor, the second distance values based on the error function.

9. The method in accordance with claim 6, wherein:
   calculating, by the processor, an error bar;
   calculating,the processor, a difference between the second distance values and the error bar;
   determining, by the processor, whether the difference is within the error bar; and
   only if the difference is within the error bar, generating the second distance values.

10. The method in accordance with claim 6, wherein generating, by the processor, second distance values based on a change by adding or subtracting a predefined fraction.

* * * * *